United States Patent
Nakamura et al.

(10) Patent No.: US 8,885,264 B2
(45) Date of Patent: Nov. 11, 2014

(54) ZOOM LENS AND IMAGE PICKUP APPARATUS INCLUDING THE SAME

(71) Applicant: Canon Kabushiki Kaisha, Tokyo (JP)

(72) Inventors: Tomoyuki Nakamura, Utsunomiya (JP); Shoichi Takemoto, Utsunomiya (JP)

(73) Assignee: Canon Kabushiki Kaisha (JP)

(*) Notice: Subject to any disclaimer, the term of this patent is extended or adjusted under 35 U.S.C. 154(b) by 204 days.

(21) Appl. No.: 13/656,965

(22) Filed: Oct. 22, 2012

(65) Prior Publication Data
US 2013/0113980 A1    May 9, 2013

(30) Foreign Application Priority Data
Oct. 24, 2011   (JP) ................. 2011-232783

(51) Int. Cl.
  *G02B 15/17* (2006.01)
  *G02B 15/14* (2006.01)
  *G02B 15/173* (2006.01)

(52) U.S. Cl.
  CPC .............. *G02B 15/14* (2013.01); *G02B 15/173* (2013.01)
  USPC ........................... 359/684; 359/676; 359/708

(58) Field of Classification Search
  CPC ...... G02B 13/009; G02B 15/00; G02B 15/14; G02B 15/15; G02B 15/16; G02B 15/173; G02B 15/20
  USPC .......... 348/240.99–240.3, 335–369; 359/432, 359/676–679, 683–685, 708, 714, 746, 753, 359/766; 396/72–88
  See application file for complete search history.

(56) References Cited

U.S. PATENT DOCUMENTS 5,561,560 A   10/1996  Tsutsumi
2009/0128923 A1*  5/2009  Toyama .................. 359/683

FOREIGN PATENT DOCUMENTS

| JP | 7-248449 A | 9/1995 |
| JP | 2009-128491 A | 6/2006 |
| JP | 2009-128492 A | 6/2009 |

\* cited by examiner

*Primary Examiner* — Darryl J Collins
*Assistant Examiner* — Gary O'Neill
(74) *Attorney, Agent, or Firm* — Rossi, Kimms & McDowell LLP

(57) ABSTRACT

A zoom lens including, in order from object side to image side: a first positive lens unit which does not move for zooming; a second negative lens unit which moves during zooming; a third positive lens unit which moves during zooming; a fourth lens unit which moves during zooming; and a fifth positive lens unit which does not move for zooming. The second unit passes through a point at which magnification of the second unit becomes −1 during zooming from wide-angle end to telephoto end, and −1<β34<−0.3, and 4.0<|m2/m3|<15 are satisfied where β34 represents a magnification of a combined unit including the third and fourth units at a zoom position fz at which the magnification of the second unit becomes −1, and m2 and m3 respectively represent displacements of the second and third units on optical axis at the zoom position fz with reference to the wide-angle end.

10 Claims, 22 Drawing Sheets

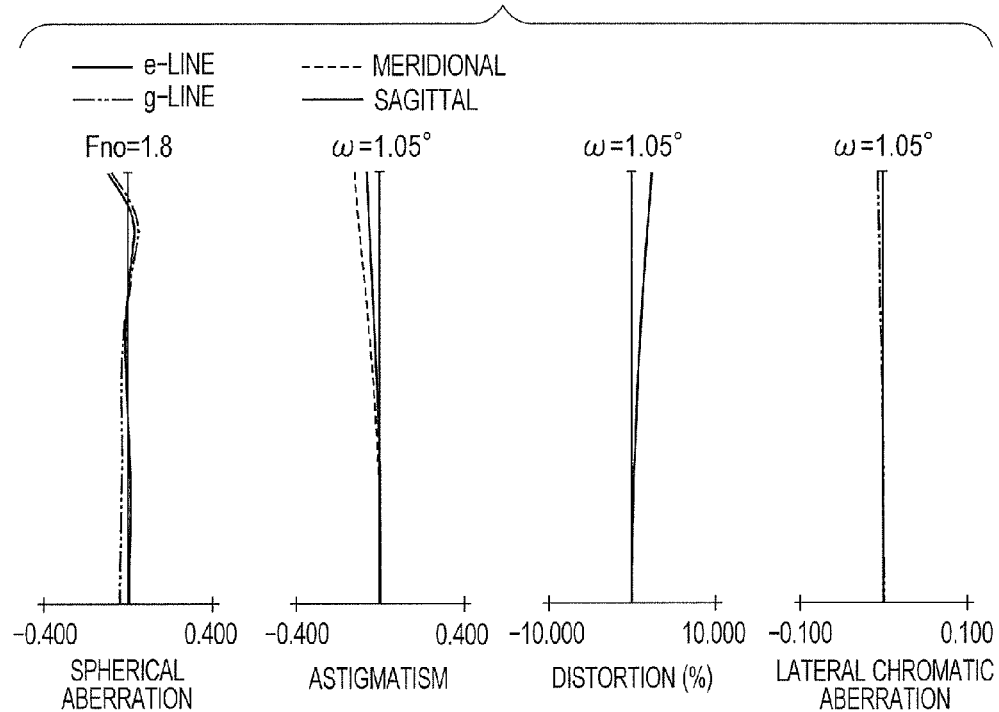
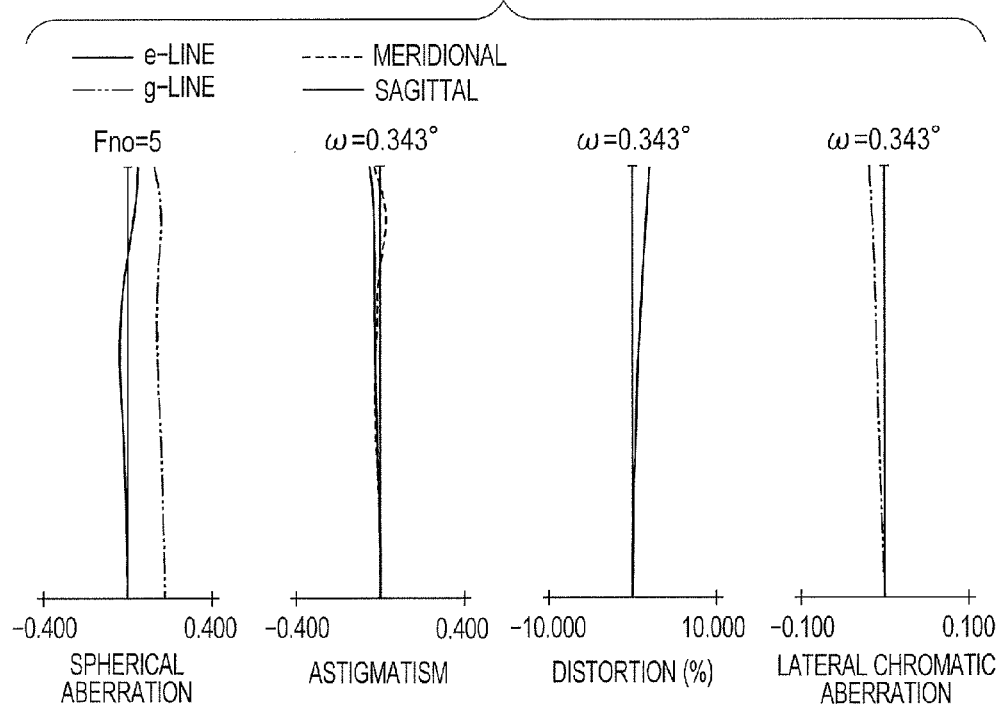

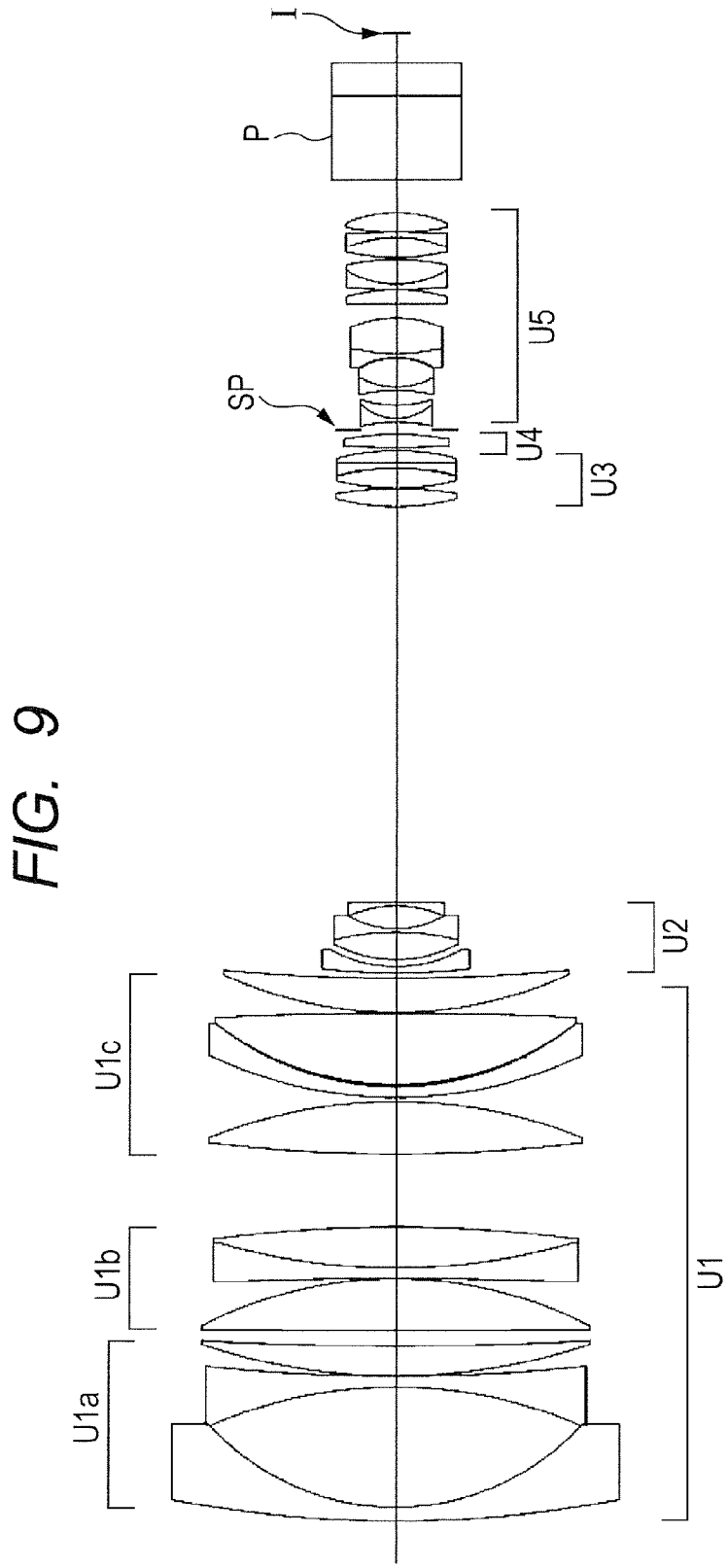

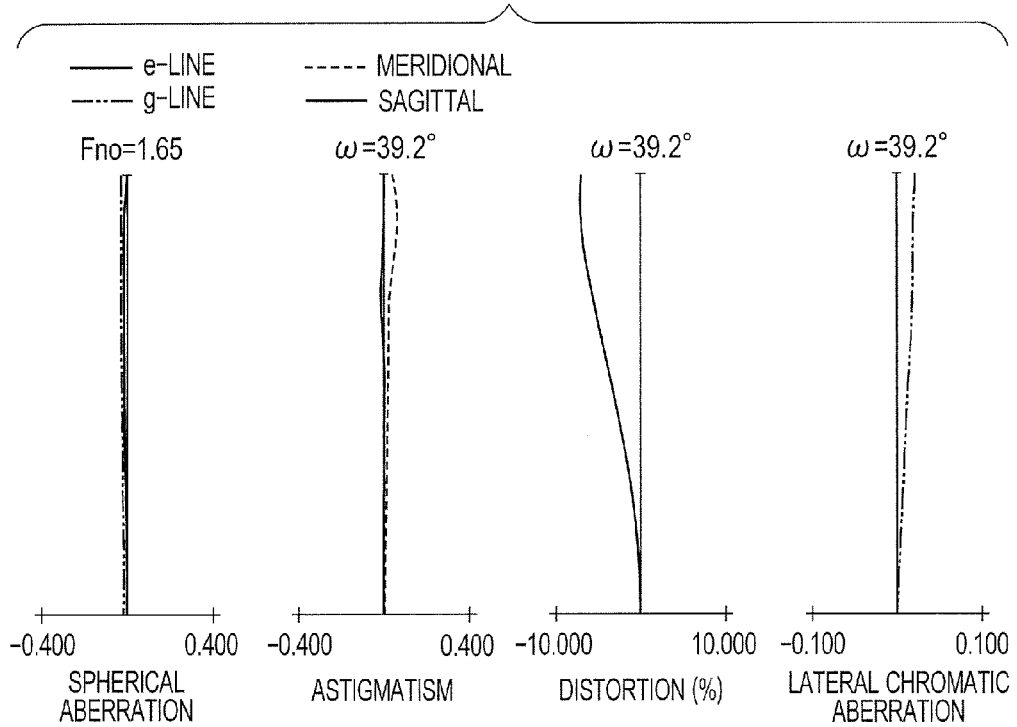
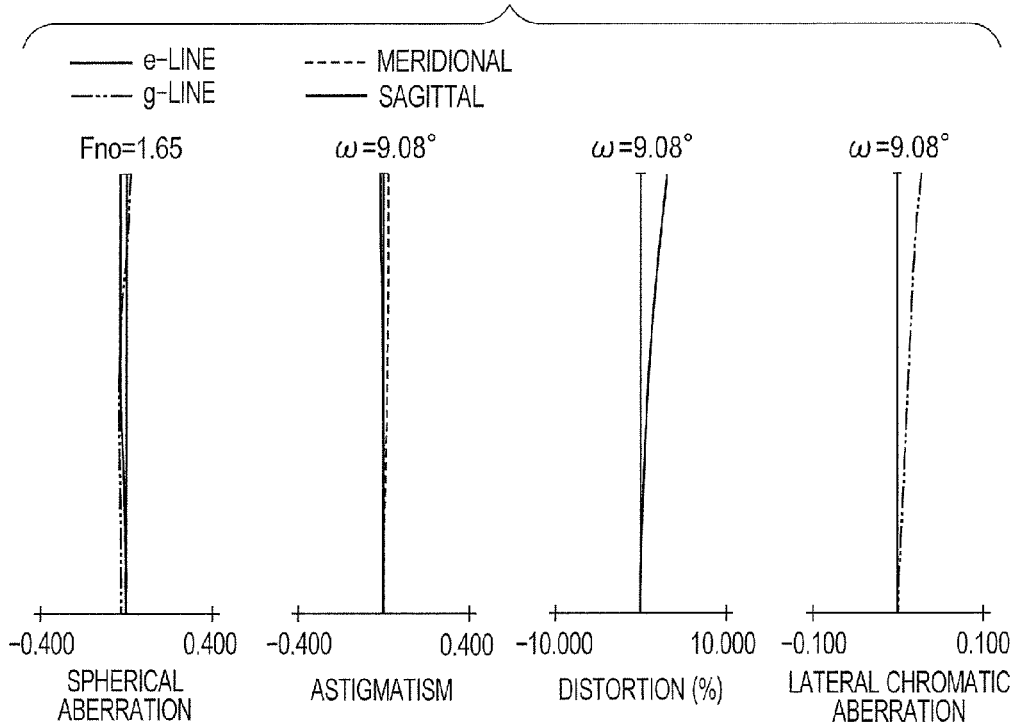

COMBINED LENS U34 OF U3 AND U4

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for, for example, a broadcasting television camera; a video camera, a digital still camera, a surveillance camera, and a silver halide film camera.

2. Description of the Related Art

In recent years, a zoom lens having a wider angle of view, a high zoom ratio, and high optical performance is required for an image pickup apparatus such as a television camera, a silver halide film camera, a digital camera, or a video camera. As a zoom lens having a wider angle of view and a high zoom ratio, a positive lead type five-unit zoom lens constituted of five lens units including a positive lens unit disposed closest to the object side is known.

As this positive lead type zoom lens, a five-unit zoom lens in which three movable lens units including a second lens unit having a negative refractive power, a third lens unit having a positive refractive power, and a fourth lens unit having a positive refractive power perform magnification-varying and correction of image plane variation due to the magnification-varying is known (Japanese Patent Application Laid-open Nos. H07-248449, 2009-128491, and 2009-128492).

Japanese Patent Application Laid-open No. H07-248449 discloses a zoom lens having a zoom ratio of approximately 17 and a photographing field angle of approximately 70 degrees at a wide-angle end. Japanese Patent Application Laid-Open Nos. 2009-128491 and 2009-128492 disclose a zoom lens having a zoom ratio of approximately 54 and a photographing field angle of approximately 60 degrees at the wide-angle end.

In order to obtain high optical performance while maintaining a wider angle of view and a higher zoom ratio in the five-unit zoom lens, it is important to appropriately set a refractive power arrangement, a configuration, and the like of each lens unit. In particular, it is important to appropriately set movement conditions during zooming of the second, third, and fourth lens units serving as magnification-varying lens units, the refractive power of the first lens unit, and the like. Other than that, it is important to appropriately set a combined refractive power of the third and fourth lens units, moving loci of the third and fourth lens units from the wide-angle end to an intermediate zoom position, and the like. If these configurations are not appropriately set, it becomes difficult to provide a zoom lens having a wide angle of view, a high zoom ratio, and high optical performance over an entire zoom range.

In the zoom lenses disclosed in Japanese Patent Application Laid-open Nos. H07-248449, 2009-128491, and 2009-128492, the refractive powers and the moving loci of the magnification-varying lens units are defined so that an imaging magnification of a combined lens unit constituted of the third and fourth lens units is always −1 when an imaging magnification of the second lens unit is −1 at a predetermined intermediate zoom position. In order to achieve such high zoom ratio of the zoom lens, effective diameters of the third and fourth lens units are apt to foe increased so that variations of aberrations due to Booming are increased. The high zoom ratio means a zoom ratio of approximately 20 to 35 when the angle of view is approximately 75 to 85 degrees at the wide-angle end or a zoom ratio of approximately 80 to 130 when the angle of view is 60 to 67 degrees at the wide-angle end. In addition, there is a tendency that an increase in mass due to the increase in the effective diameter causes difficulty in securing higher speed of zoom action and quick response to zoom operation.

SUMMARY OF THE INVENTION

The present invention provides a zoom lens having a wide angle of view, a high zoom ratio, high optical performance over an entire zoom range, and good zoom action, and to provide an image pickup apparatus including the zoom lens.

According to an exemplary embodiment of the present invention, there is provided a zoom lens including, in order from an object side to an image side: a first lens unit having a positive refractive power which does not move for zooming; a second lens unit having a negative refractive power which moves during Booming; a third lens unit having a positive refractive power which moves during zooming; a fourth lens unit which moves during zooming; and a fifth lens unit having a positive refractive power which does not move for zooming, in which the second lens unit passes through a point at which an imaging magnification of the second lens unit becomes −1 during zooming from a wide-angle end to a telephoto end, and the following expressions are satisfied:

$$-1 < \beta 34 < -0.3, \text{ and}$$

$$4.0 < |m2/m3| < 15,$$

where β34 represents an imaging magnification of a combined lens unit including the third lens unit and the fourth lens unit at a zoom position fz where the imaging magnification of the second lens unit becomes −1, and m2 and m3 respectively represent displacements of the second lens unit and the third lens unit on an optical axis at the zoom position fz with reference to the wide-angle end.

According to the present invention, it is possible to provide a zoom lens having a wide angle of view, a high zoom ratio, and high optical performance over an entire zoom range, and to provide an image pickup apparatus including the zoom lens.

Further features of the present invention will become apparent from the following description of exemplary embodiments with reference to the attached drawings.

BRIEF DESCRIPTION OF THE DRAWINGS

FIG. 4C is an aberration graph when focusing on an infinite object in the vicinity of the zoom position fz according to Numerical Embodiment 2.

FIG. 4D is an aberration graph when focusing on an infinite object at the telephoto end according to Numerical Embodiment 2.

FIG. 9 is a lens cross-sectional view when focusing on an infinite object at the wide-angle end according to Numerical Embodiment 5 of the present invention.

FIG. 10A is an aberration graph when focusing on an infinite object at the wide-angle end according to Numerical Embodiment 5.

FIG. 10B is an aberration graph when focusing on an infinite object at the intermediate zoom position according to Numerical Embodiment 5.

DESCRIPTION OF THE EMBODIMENTS

Hereinafter, an embodiment of the present invention is described in detail with reference to the attached drawings.

A zoom lens of the present invention includes, in order from an object side to an image side, a first lens unit U1 having a positive refractive power that does not move for zooming, a second lens unit U2 having a negative refractive power that moves during zooming, a third lens unit U3 having a positive refractive power that moves during zooming, a fourth lens unit U4 that moves during zooming, and a fifth lens unit U5 having a positive refractive power that does not move for zooming.

The expression that "a lens unit does not move for zooming" means herein that the lens unit is not driven for a purpose of zooming, but the lens unit may move for focusing if scorning and focusing are performed simultaneously.

Figure 1:
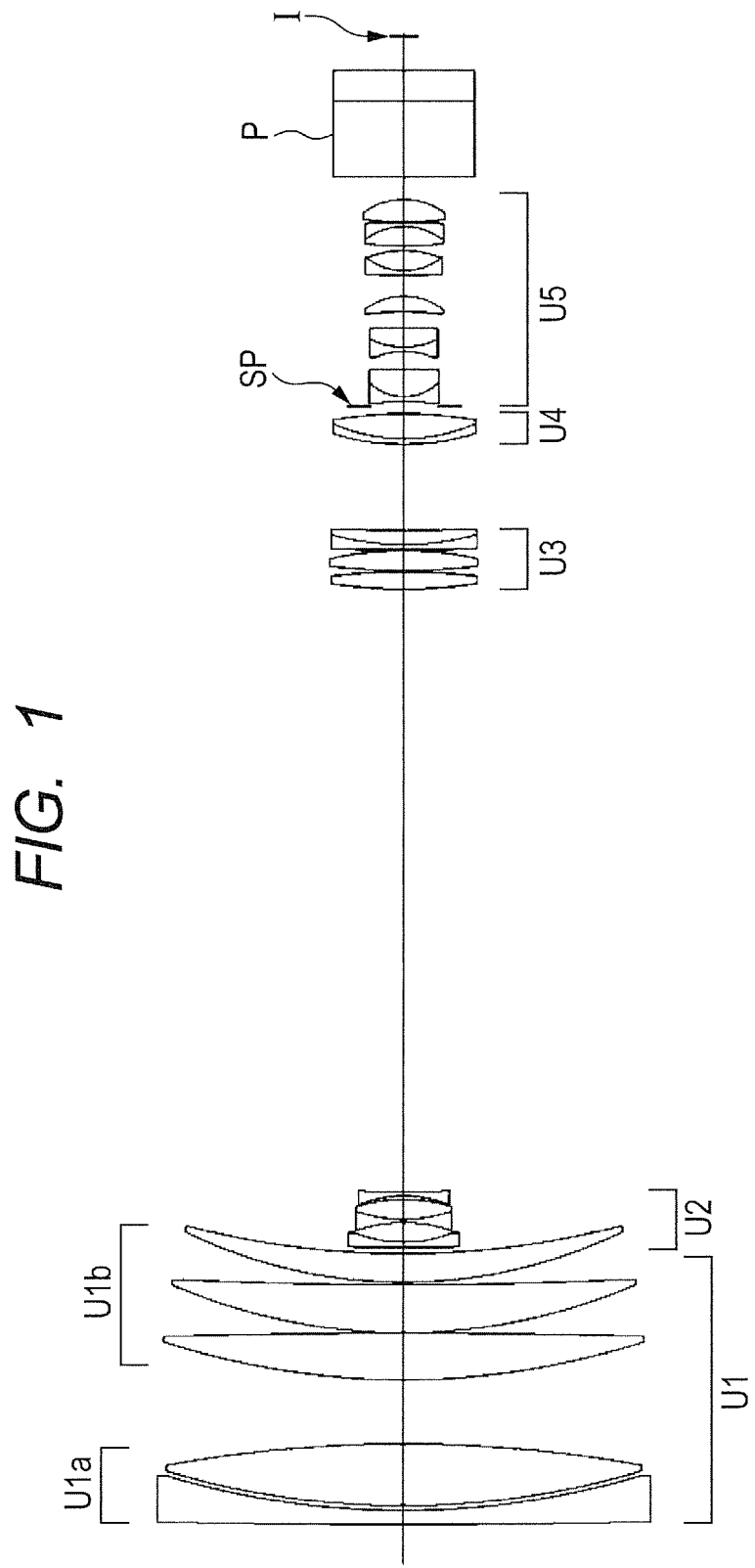
FIG. 1 is a lens cross-sectional view when focusing on an infinite object at a wide-angle end according to numerical Embodiment 1 of the present invention.
Figure 2A:
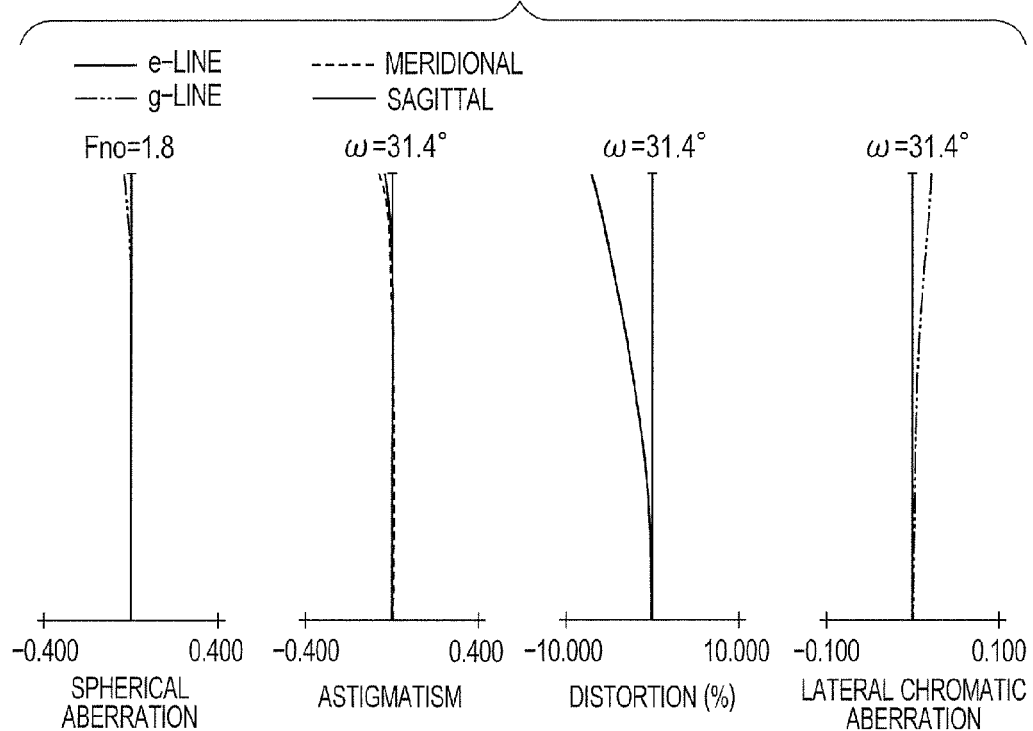
FIG. 2A is an aberration graph when focusing on an infinite object at the wide-angle end according to Numerical Embodiment 1.
Figure 2B:
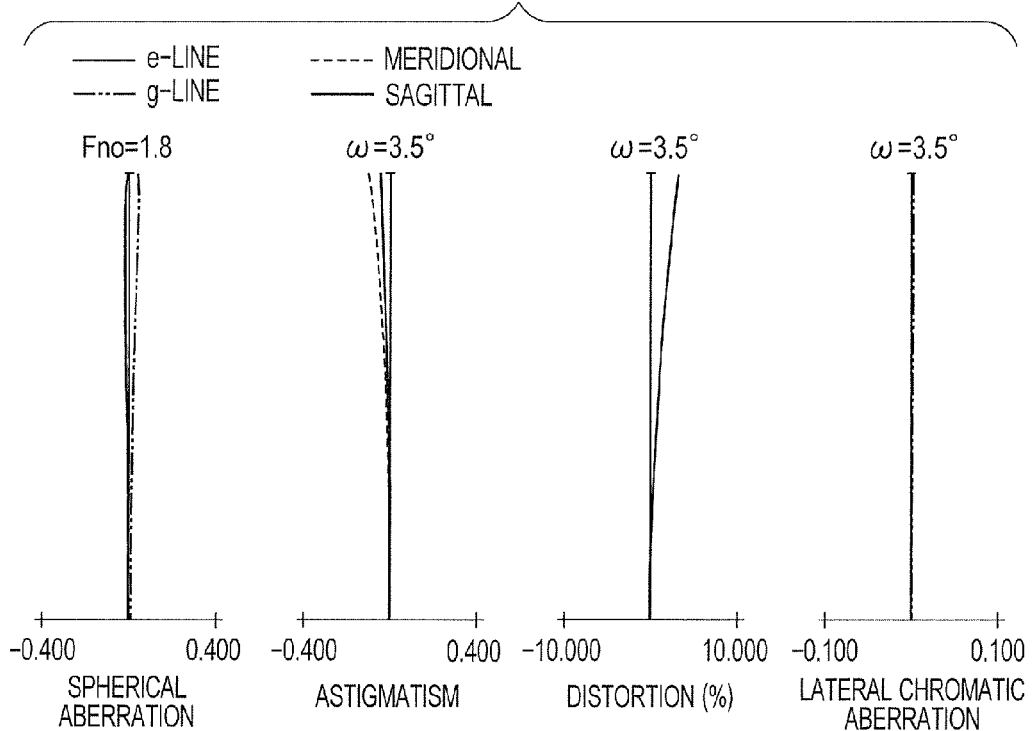
FIG. 2B is an aberration graph when focusing on an infinite object at an intermediate zoom position according to Numerical Embodiment 1.
Figure 2C:
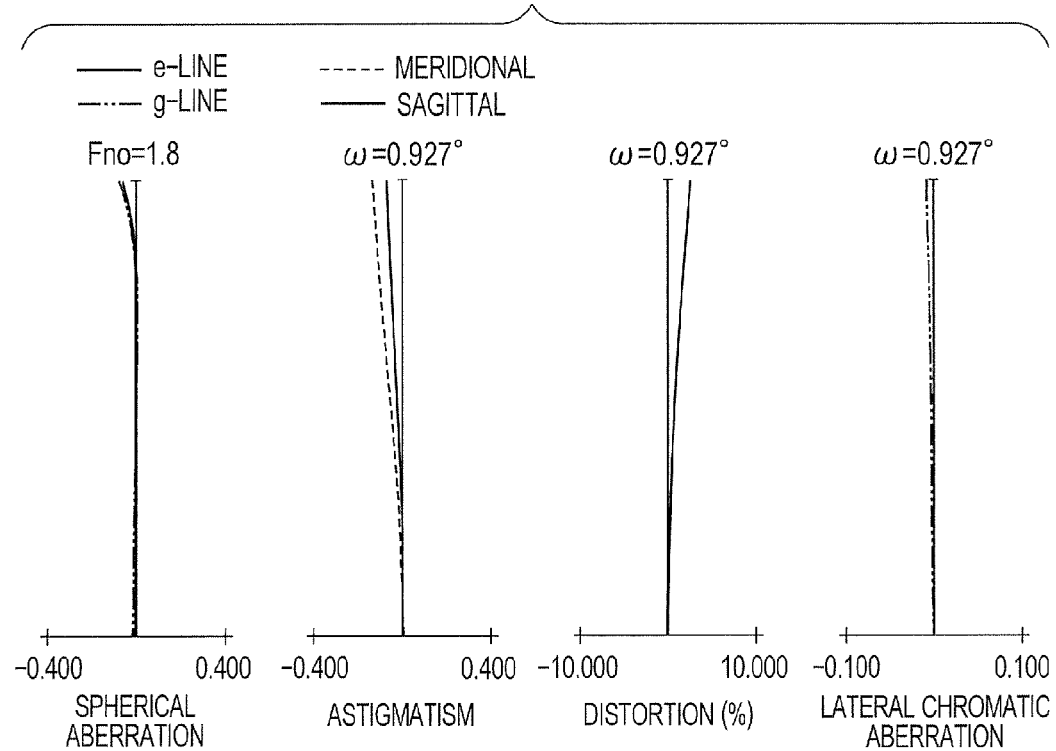
FIG. 2C is an aberration graph when focusing on an infinite object in the vicinity of a zoom position fz according to Numerical Embodiment 1.
Figure 2D:
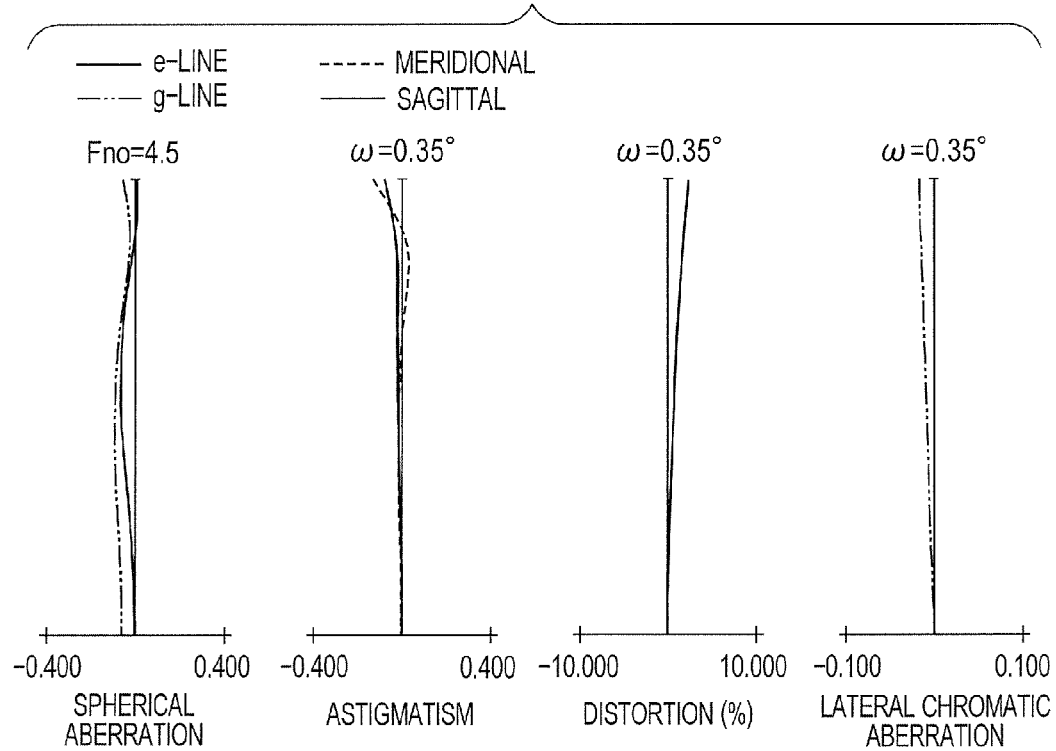
FIG. 2D is an aberration graph when focusing on an infinite object at a telephoto end according to Numerical Embodiment 1.

FIG. 1 is a lens cross-sectional view of a zoom lens according to Embodiment 1 (Numerical Embodiment 1) of the present invention when focusing on an infinite object at a wide-angle end (focal length f=9.0 mm). FIGS. 2A, 2B, 2C, and 2D are aberration graphs respectively at the wide-angle end, at an intermediate zoom position (focal length f=90 mm), in the vicinity of a zoom position fz (focal length f=340 mm), and at a telephoto end (f=900 mm) when focusing on an infinite object according to Numerical Embodiment 1. Here, the focal length is a value of this Numerical Embodiment expressed in millimeters, and fz represents a scorn position when the second lens unit U2 has an imaging magnification $\beta 2$ of −1. Here, the zoom position indicates a certain focal length between the wide-angle end and telephoto end and the zoom position fz indicates the zoom position (zoom state) at which the focal length is fz. The same is true for the following embodiments.

Figure 3:
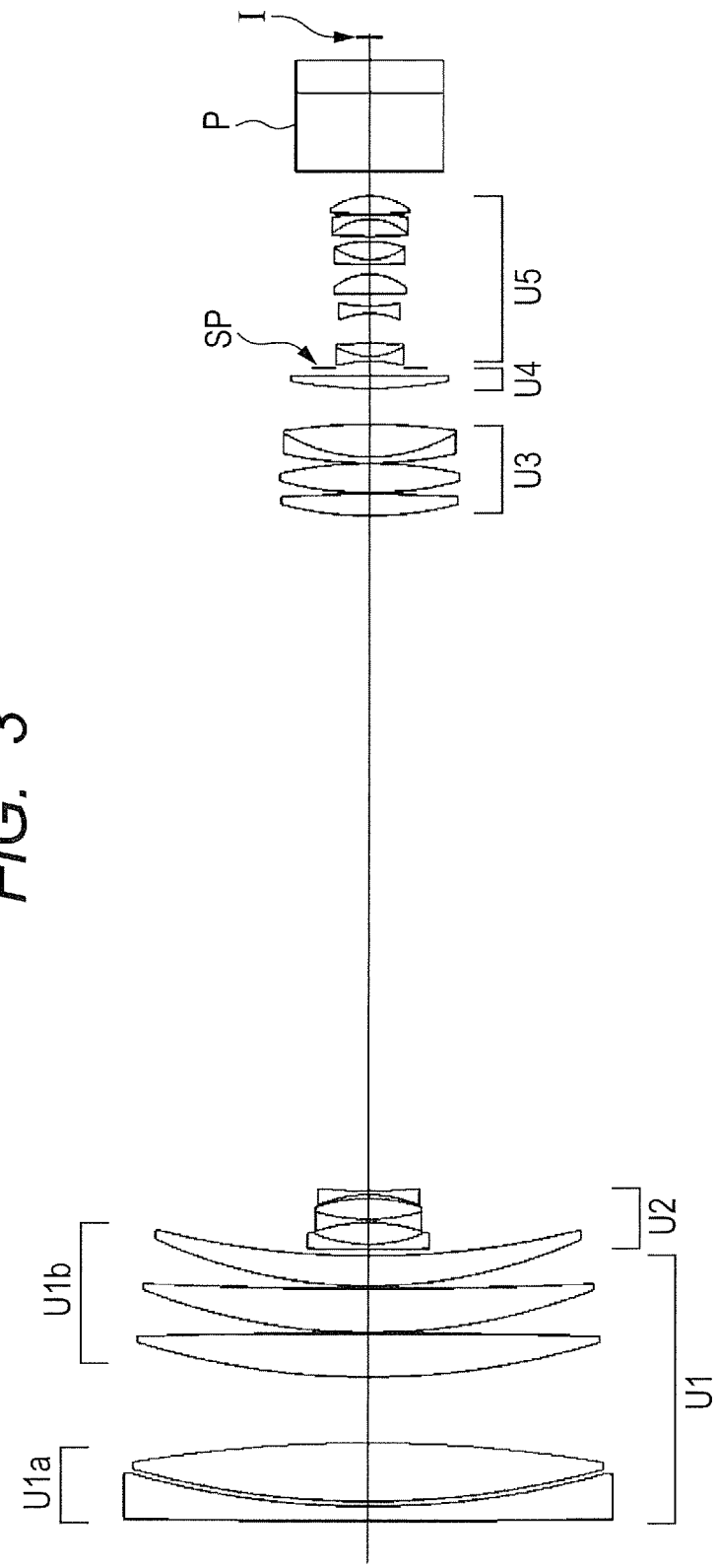
FIG. 3 is a lens cross-sectional view when focusing on an infinite object at a wide-angle end according to Numerical Embodiment 2 of the present invention.
Figure 4A:
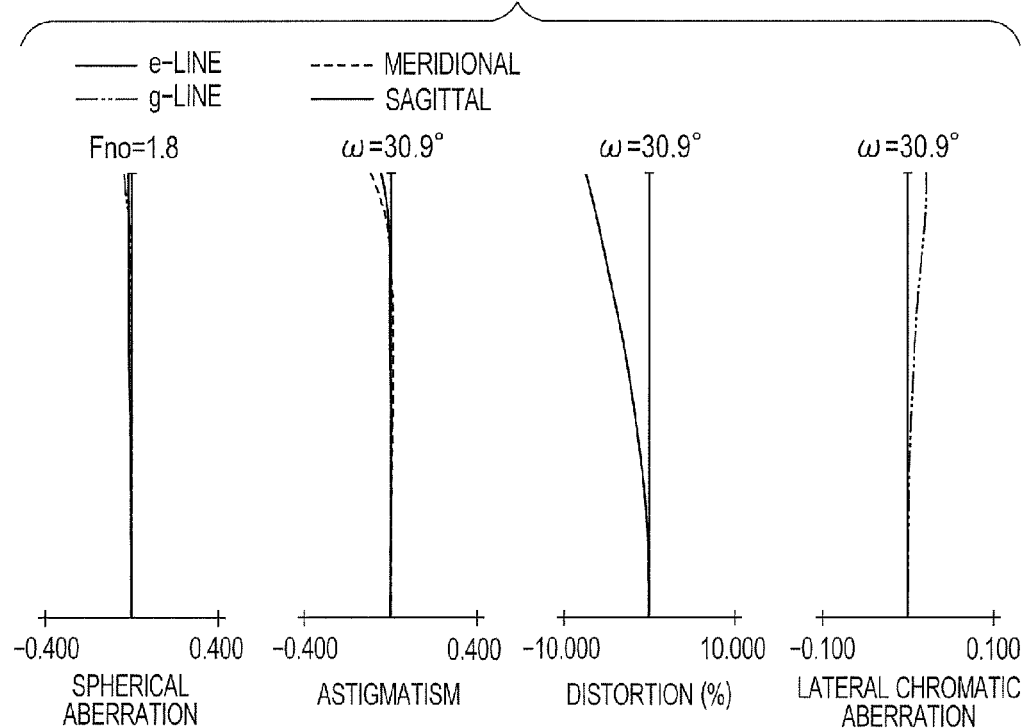
FIG. 4A is an aberration graph when focusing on an infinite object at the wide-angle end according to Numerical Embodiment 2.
Figure 4B:
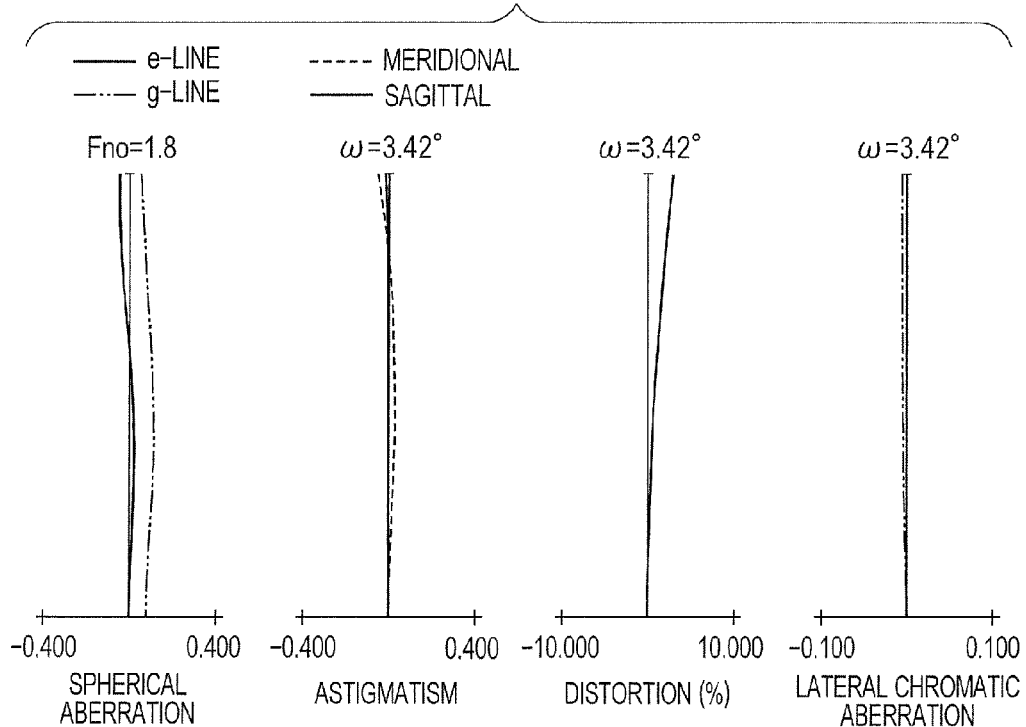
FIG. 4B is an aberration graph when focusing on an infinite object at the intermediate zoom position according to Numerical Embodiment 2.

FIG. 3 is a lens cross-sectional view of a zoom lens according to Embodiment 2 (Numerical Embodiment 2) of the present invention at a wide-angle end (focal length f=9.2 mm) when focusing on an infinite object. FIGS. 4A, 4B, 4C, and 4D are aberration graphs respectively at the wide-angle end, at an intermediate zoom position (focal length f=92 mm), in the vicinity of a zoom position fz (focal length f=300 mm), and at a telephoto end (f=920 mm) when focusing on an infinite object according to Numerical Embodiment 2.

Figure 5:
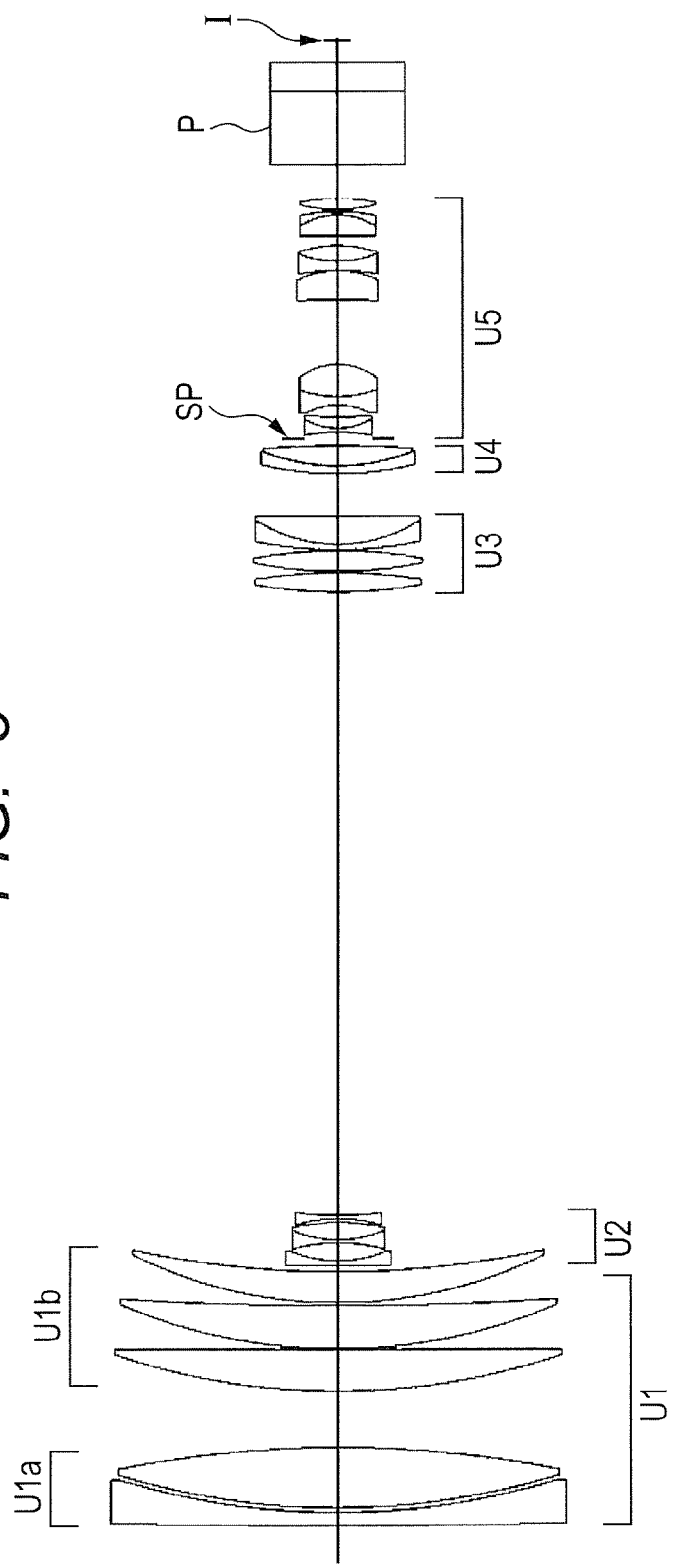
FIG. 5 is a lens cross-sectional view when focusing on an infinite object at the wide-angle end according to Numerical Embodiment 3 of the present invention.
Figure 6A:
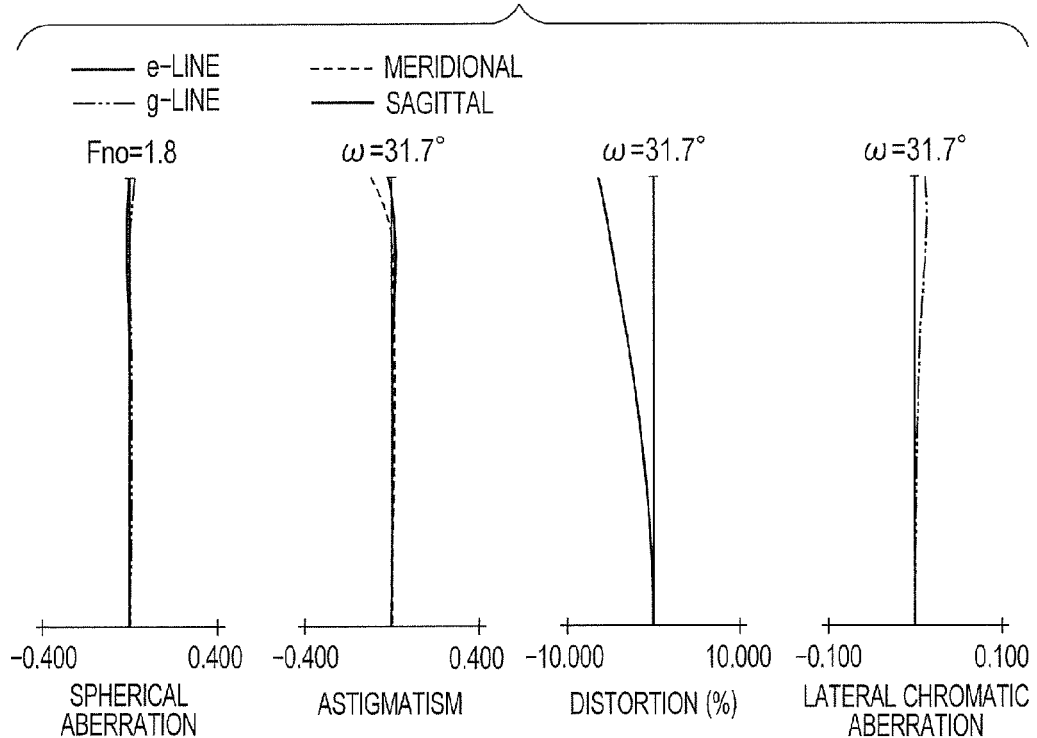
FIG. 6A is an aberration graph when focusing on an infinite object at the wide-angle end according to Numerical Embodiment 3.
Figure 6B:
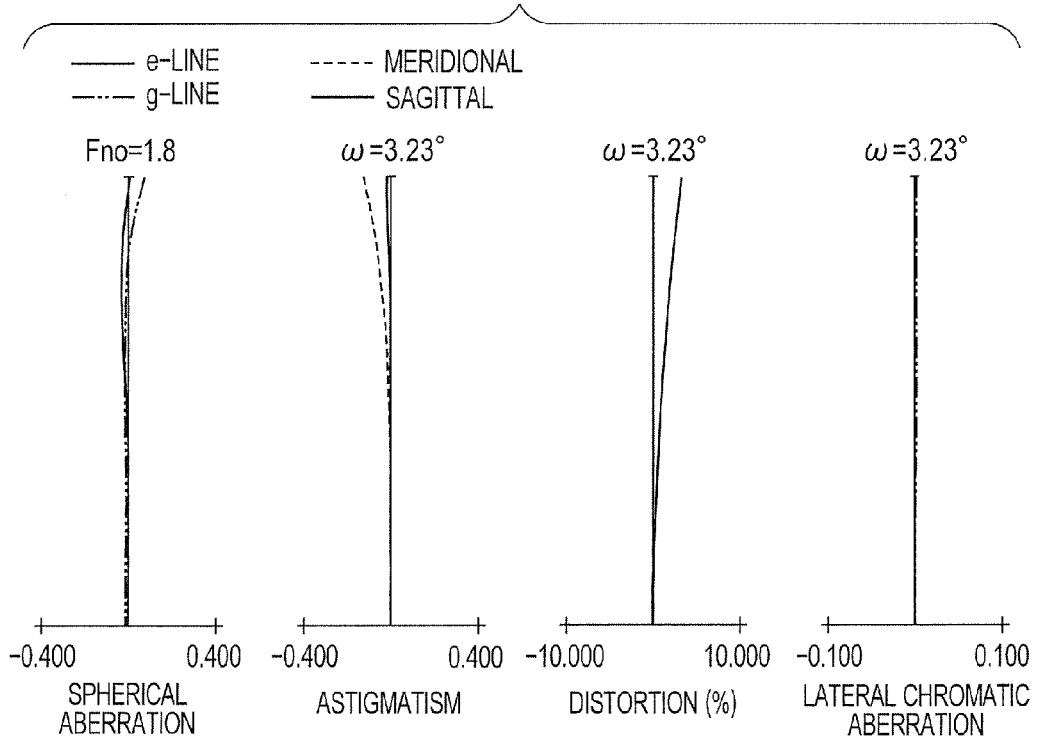
FIG. 6B is an aberration graph when focusing on an infinite object at the intermediate zoom position according to Numerical Embodiment 3.
Figure 6C:
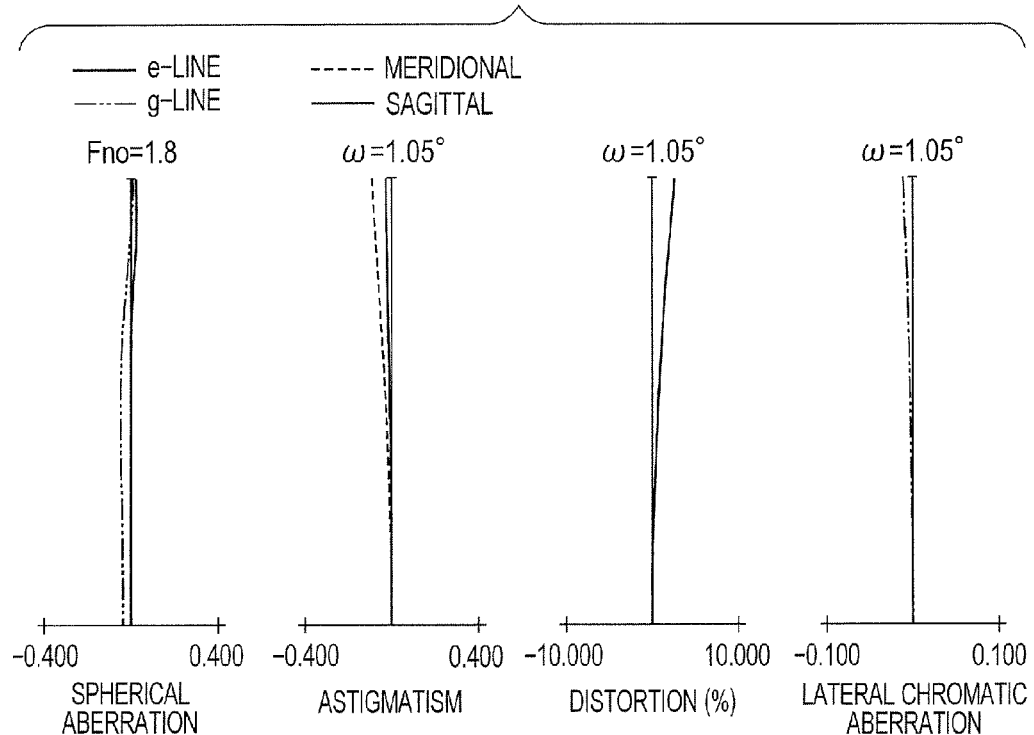
FIG. 6C is an aberration graph when focusing on an infinite object in the vicinity of the zoom position fz according to numerical Embodiment 3.
Figure 6D:
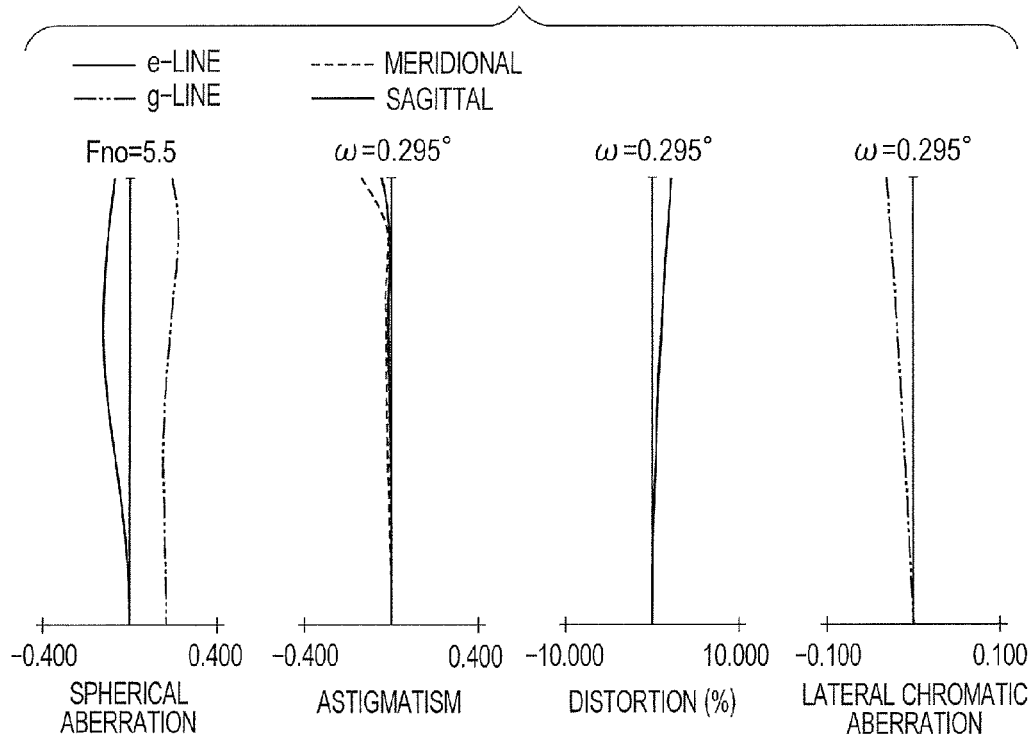
FIG. 6D is an aberration graph when focusing on an infinite object at the telephoto end according to Numerical Embodiment 3.

FIG. 5 is a lens cross-sectional view of a zoom lens according to Embodiment 3 (Numerical Embodiment 3) of the present invention at a wide-angle end (focal length f=8.9 mm) when focusing on an infinite object. FIGS. 6A, 6B, 6C and 6D are aberration graphs respectively at the wide-angle end, at an intermediate zoom position (focal length f=97.5 mm), in the vicinity of a zoom position fz (focal length f=300 mm), and at a telephoto end (f=1,068 mm) when focusing on an infinite object according to Numerical Embodiment 3.

Figure 7:
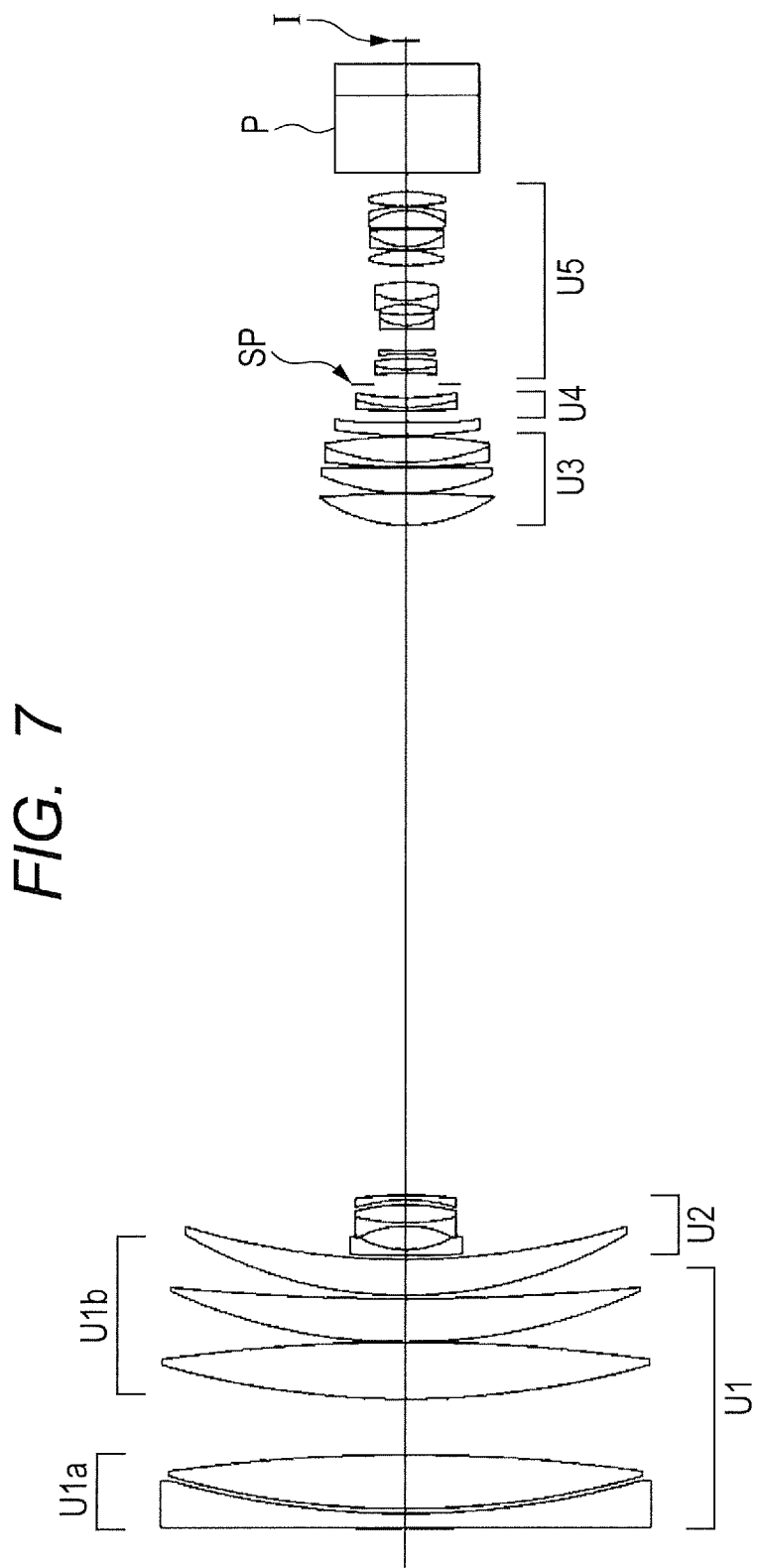
FIG. 7 is a lens cross-sectional view when focusing on an infinite object at the wide-angle end according to Numerical Embodiment 4 of the present invention.
Figure 8A:
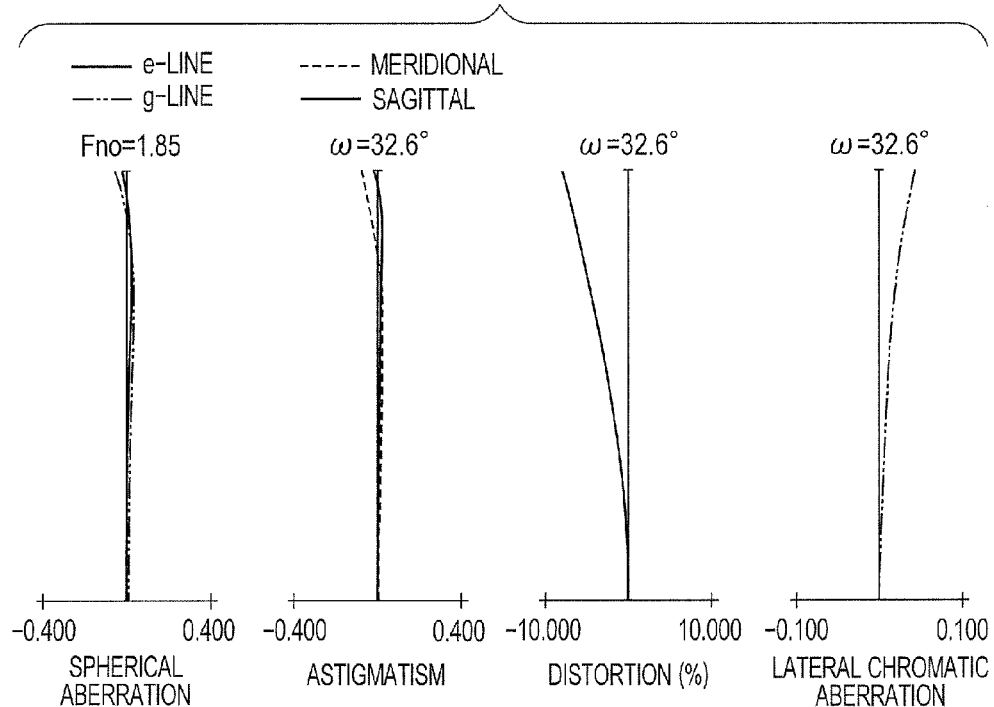
FIG. 8A is an aberration graph when focusing on an infinite object at the wide-angle end according to Numerical Embodiment 4.
Figure 8B:
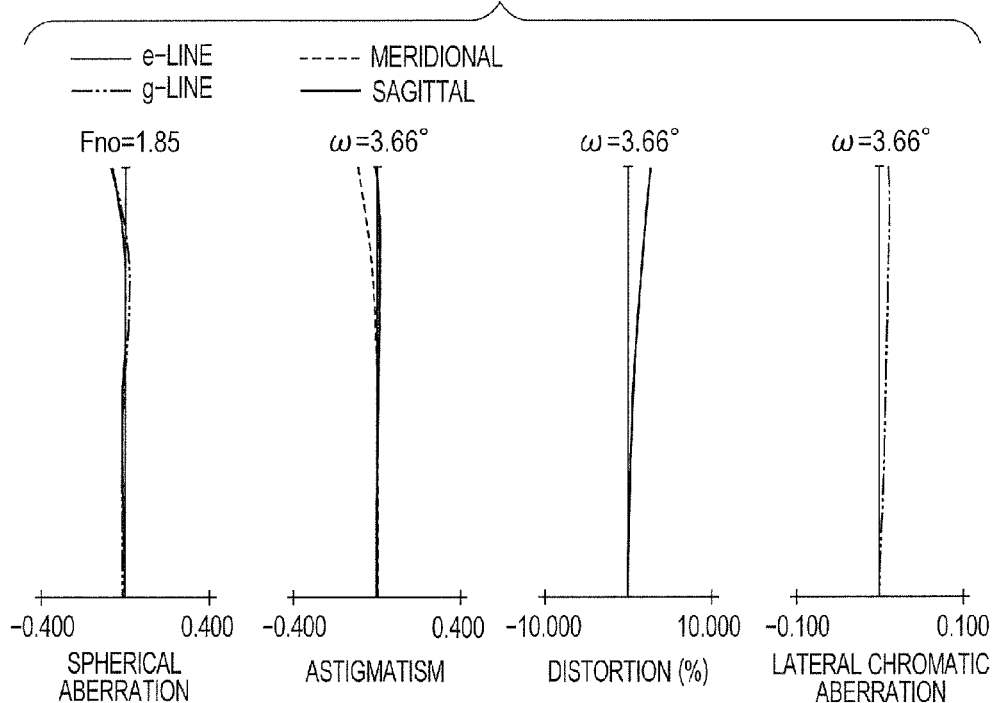
FIG. 8B is an aberration graph when focusing on an infinite object at the intermediate zoom position according to numerical Embodiment 4.
Figure 8C:
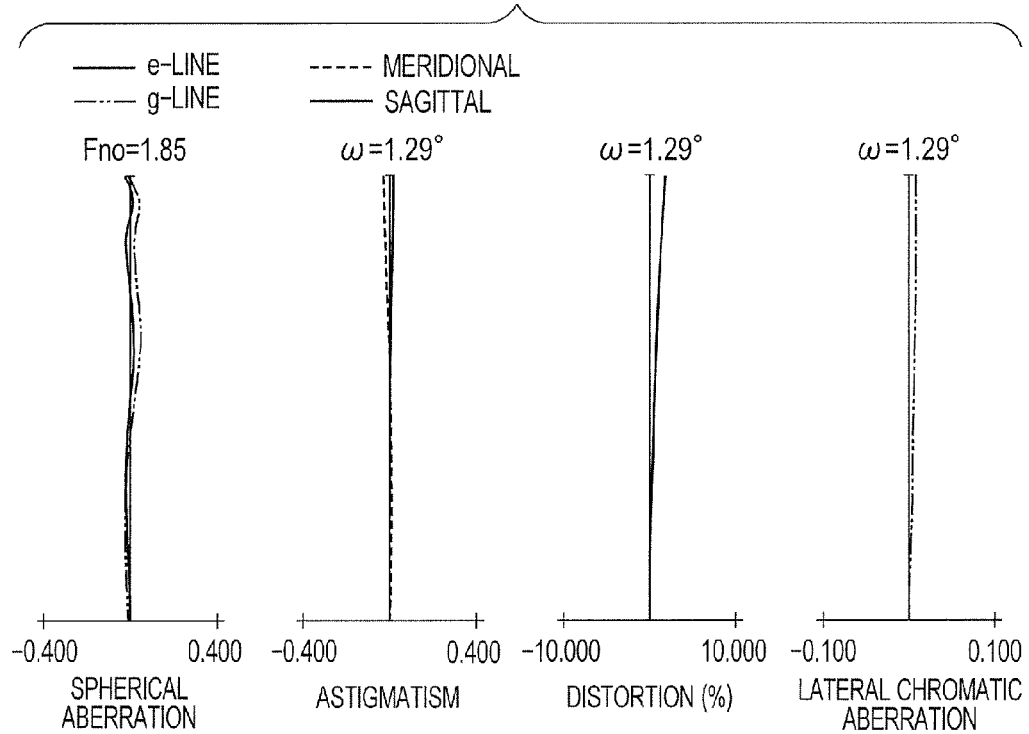
FIG. 8C is an aberration graph when focusing on an infinite object in the vicinity of the zoom position fz according to Numerical Embodiment 4.
Figure 8D:
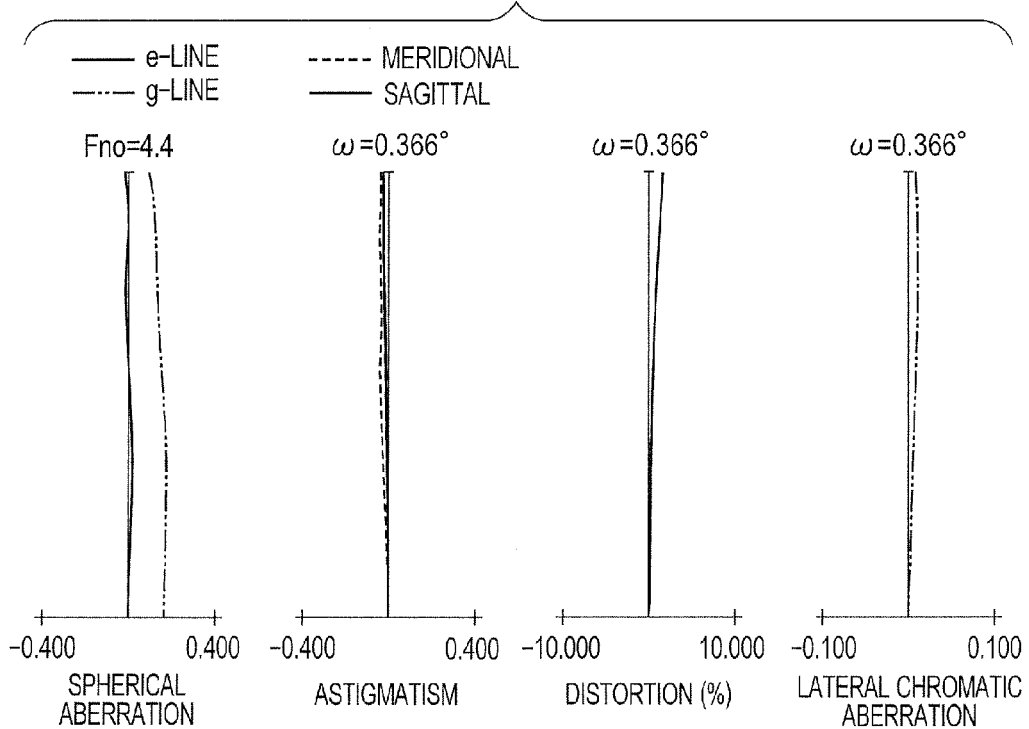
FIG. 8D is an aberration graph when focusing on an infinite object at the telephoto end according to Numerical Embodiment 4.
Figure 10C:
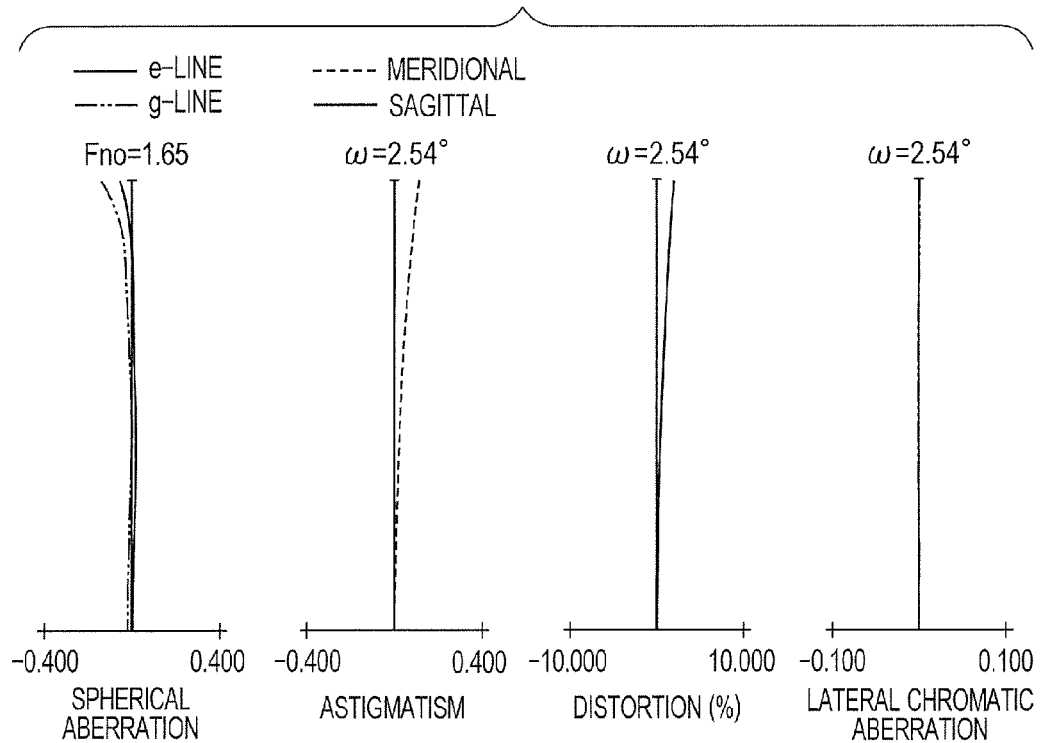
FIG. 10C is an aberration graph when focusing on an infinite object in the vicinity of the zoom position fz according to numerical Embodiment 5.
Figure 10D:
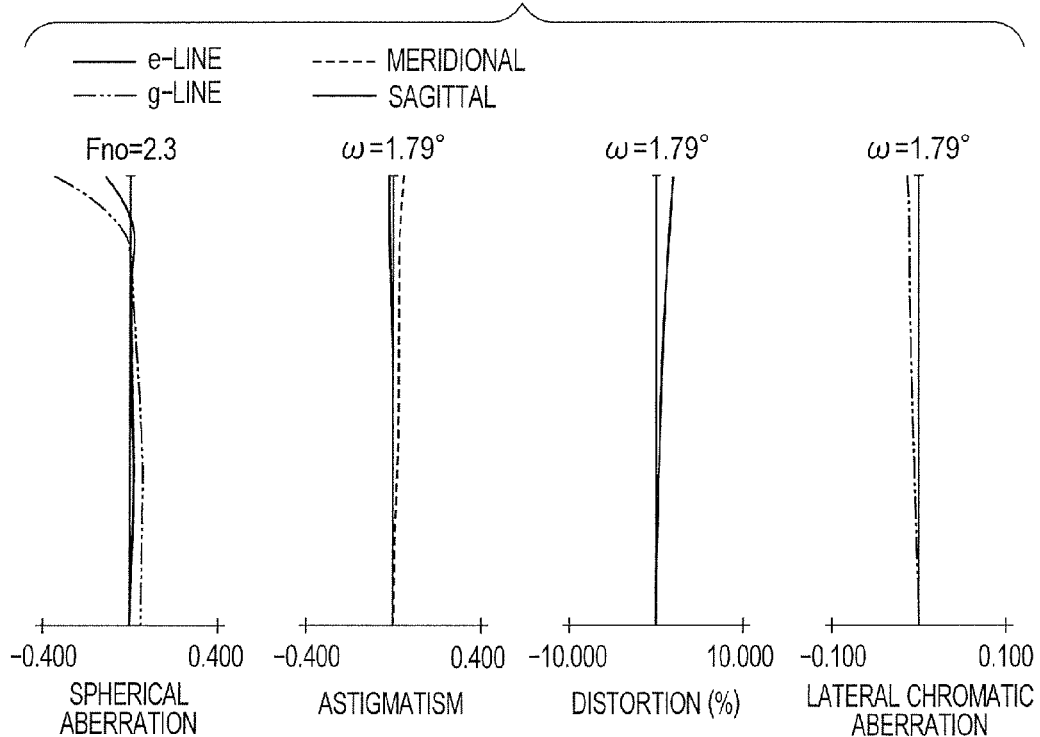
FIG. 10D is an aberration graph when focusing on an infinite object at the telephoto end according to Numerical Embodiment 5.

FIG. 7 is a lens cross-sectional view of a zoom lens according to Embodiment 4 (Numerical Embodiment 4) of the present invention at a wide-angle end (focal length f=8.6 mm) when focusing on an infinite object. FIGS. 8A, 8B, 8C, and 8D are aberration graphs respectively at the wide-angle end, at an intermediate zoom position (focal length f=86 mm), in the vicinity of a zoom position fz (focal length f=245 mm), and at a telephoto end (f=860 mm) when focusing on an infinite object according to Numerical Embodiment 4.

FIG. 9 is a lens cross-sectional view of a zoom lens according to Embodiment 5 (Numerical Embodiment 5) of the present invention at a wide-angle end (focal length f=6.75 mm) when focusing on an infinite object. FIGS. 10A, 10B, 10C, and 10D are aberration graphs respectively at the wide-angle end, at an intermediate room position (focal length f=34.4 mm), in the vicinity of a zoom position fz (focal length f=124 mm), and at a telephoto end (f=175.5 mm) when focusing on an infinite object according to Numerical Embodiment 5.

Figure 11:
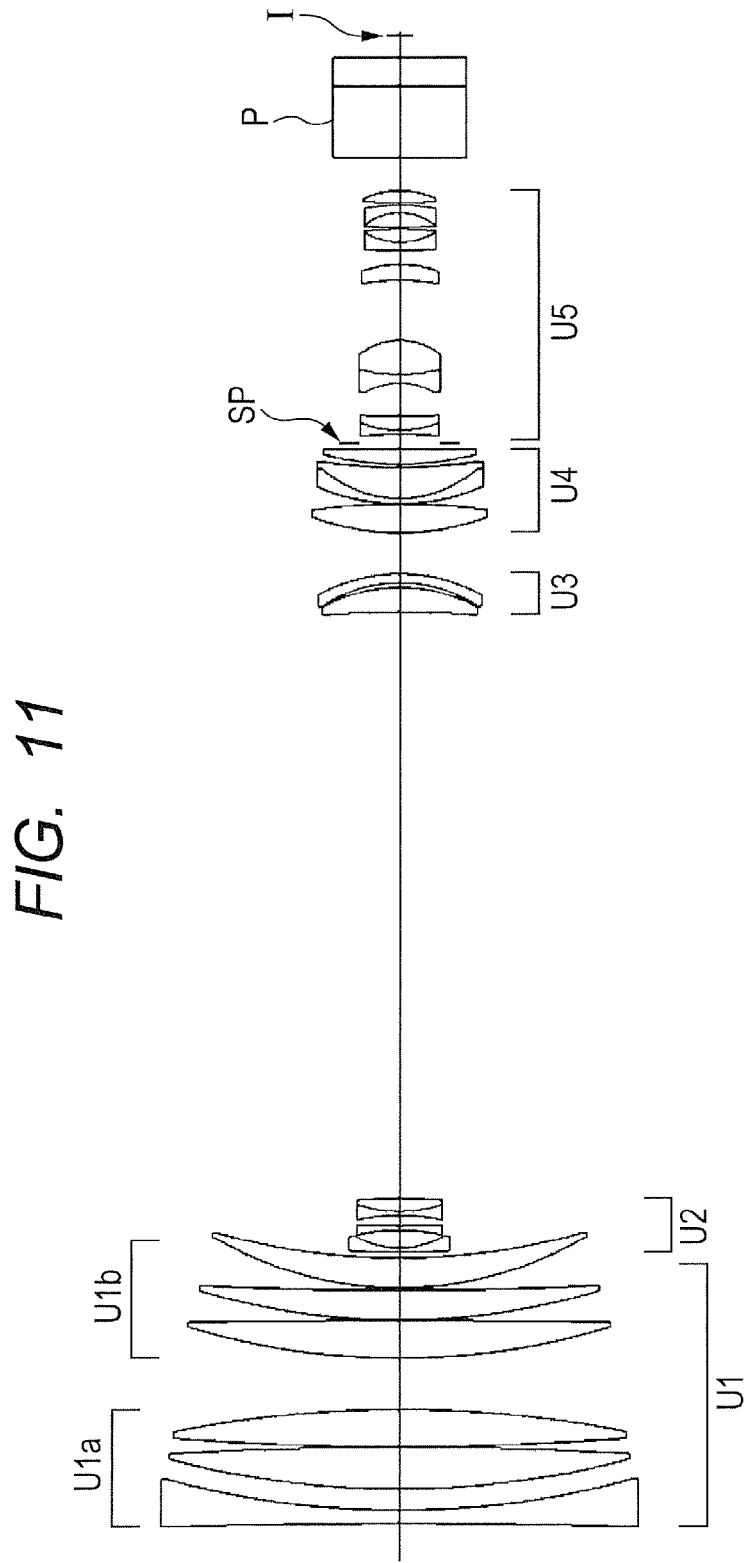
FIG. 11 is a lens cross-sectional view when focusing on an infinite object at the wide-angle end according to Numerical Embodiment 6 of the present invention.
Figure 12A:
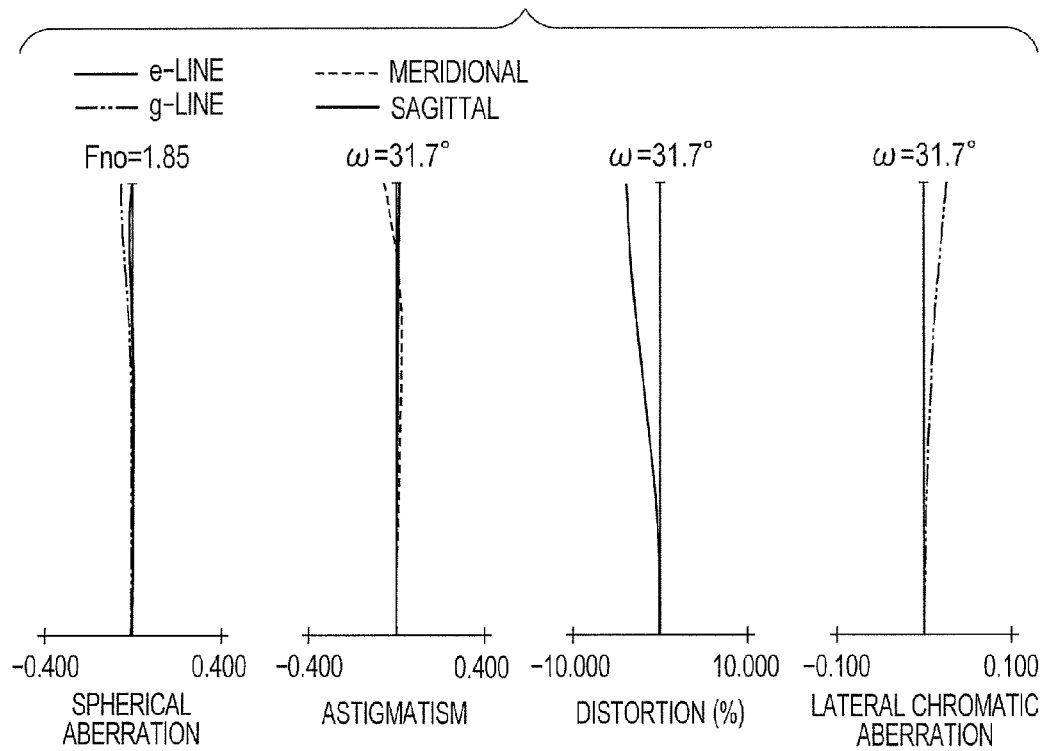
FIG. 12A is an aberration graph when focusing on an infinite object at the wide-angle end according to Numerical Embodiment 6.
Figure 12B:
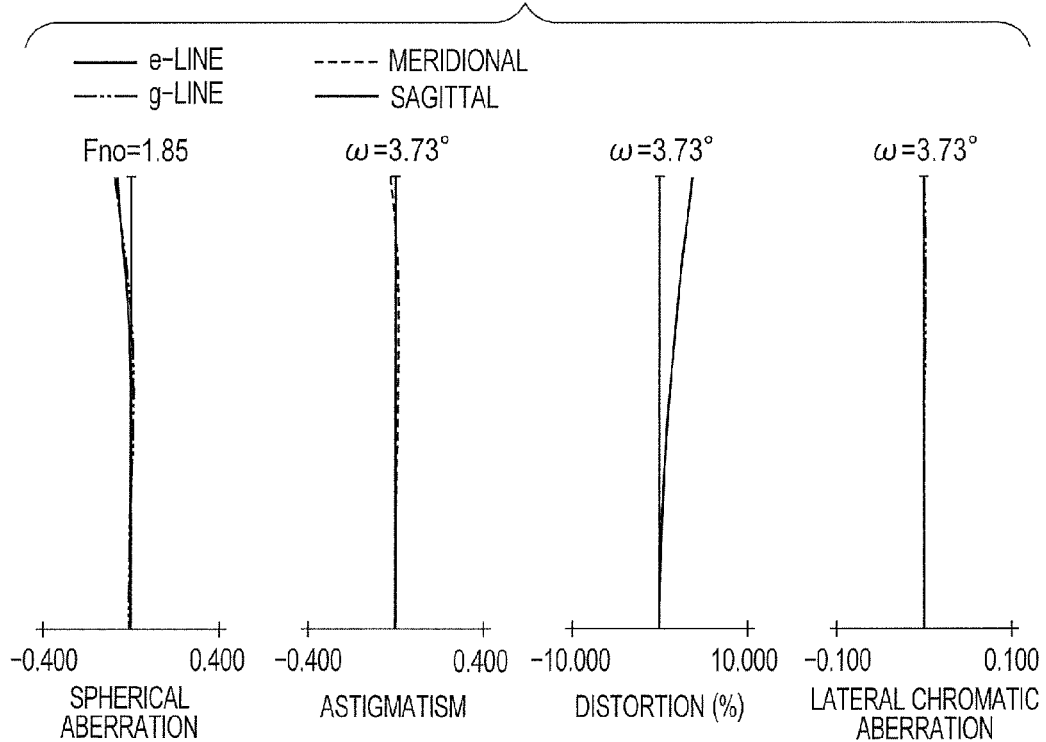
FIG. 12B is an aberration graph when focusing on an infinite object at the intermediate zoom position according to Numerical Embodiment 6.
Figure 12C:
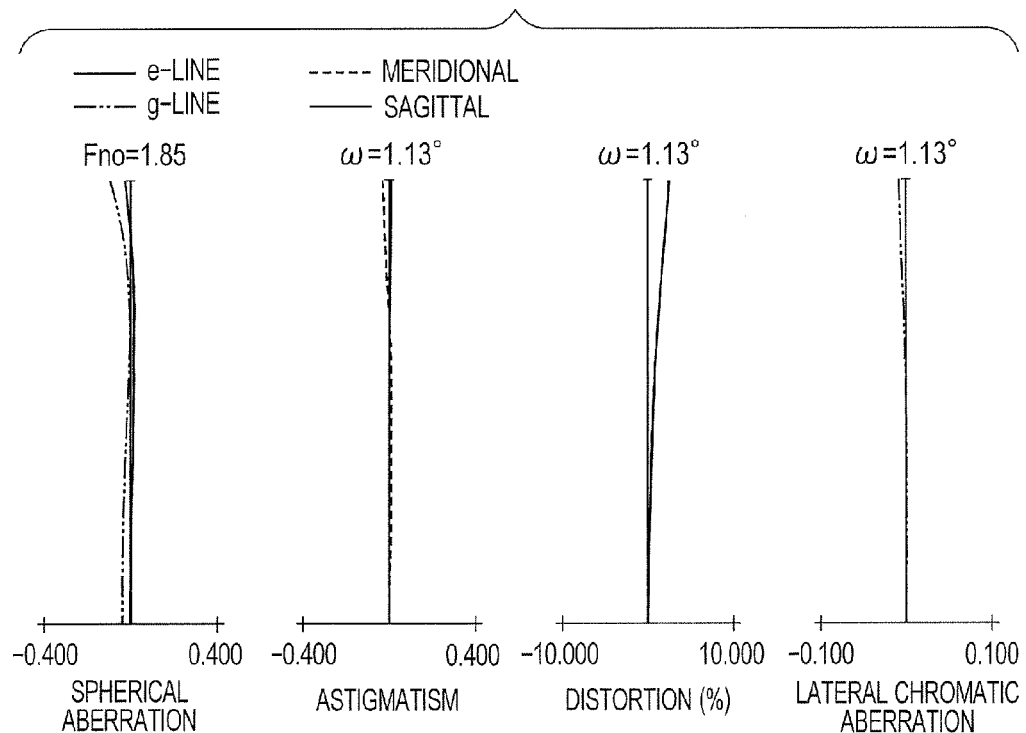
FIG. 12C is an aberration graph when focusing on an infinite object in the vicinity of the zoom position fz according to Numerical Embodiment 6.
Figure 12D:
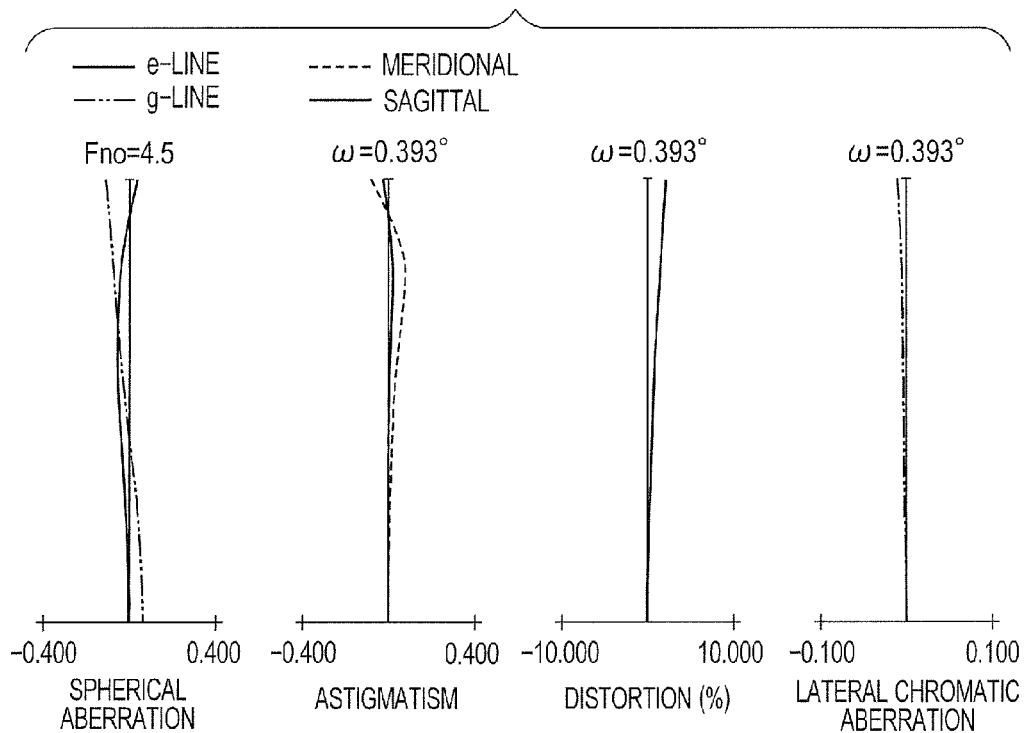
FIG. 12D is an aberration graph when focusing on an infinite object at the telephoto end according to Numerical Embodiment 6.

FIG. 11 is a lens cross-sectional view of a zoom lens according to Embodiment 6 (Numerical Embodiment 6) of the present invention at a wide-angle end (focal length f=8.9 mm) when focusing on an infinite object. FIGS. 12A, 12B, 12C, and 12D are aberration graphs respectively at the wide-angle end, at an intermediate zoom position (focal length f=84.4 mm), in the vicinity of a zoom position fz (focal length f=280 mm), and at a telephoto end (f=801 mm) when focusing on an infinite object according to Numerical Embodiment 6.

Figure 13:
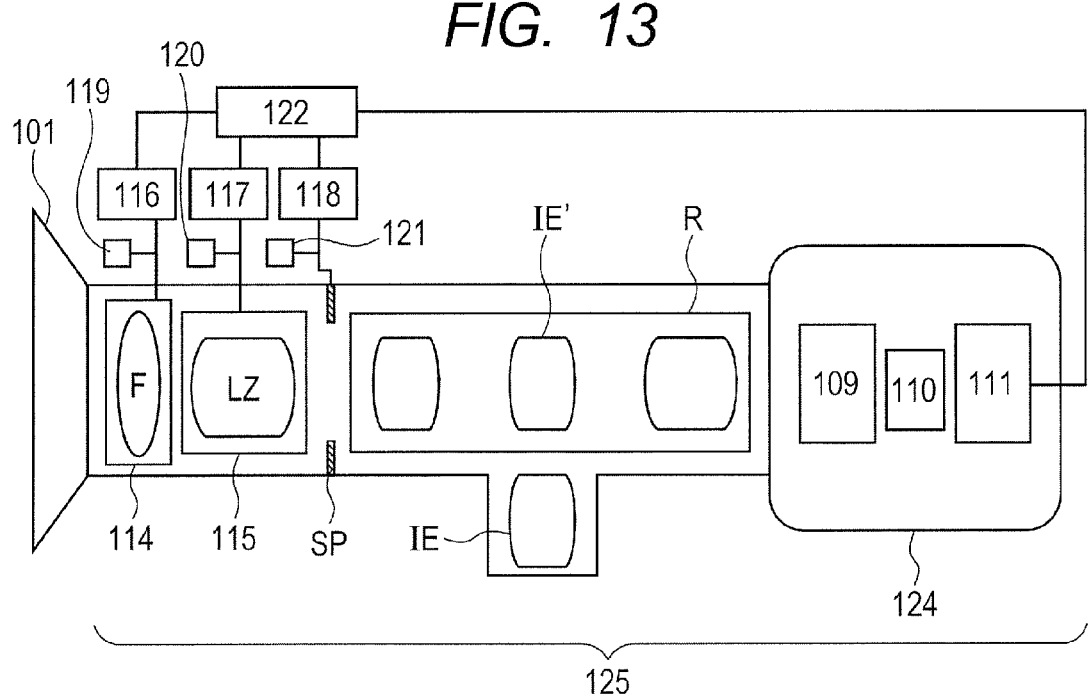
FIG. 13 is a schematic diagram of a main part of an image pickup apparatus of the present invention.
Figure 14:
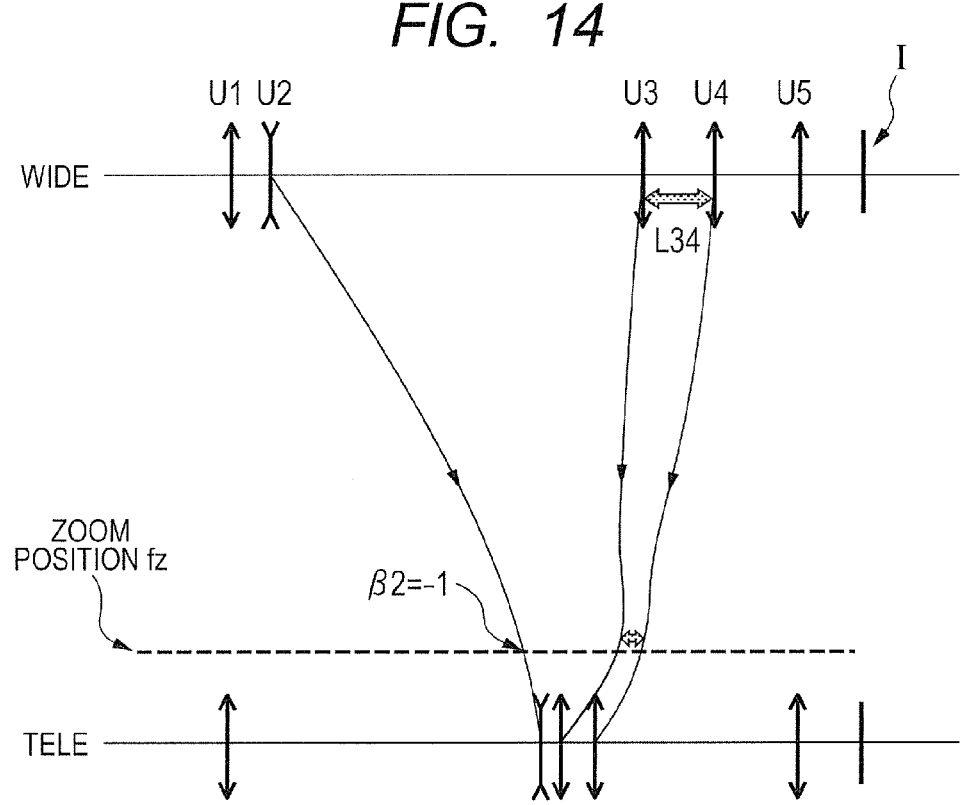
FIG. 14 is a schematic diagram of a paraxial refractive power arrangement of zoom lenses according to Embodiments 1 to 3, 5, and 6 of the present invention.
Figure 15:
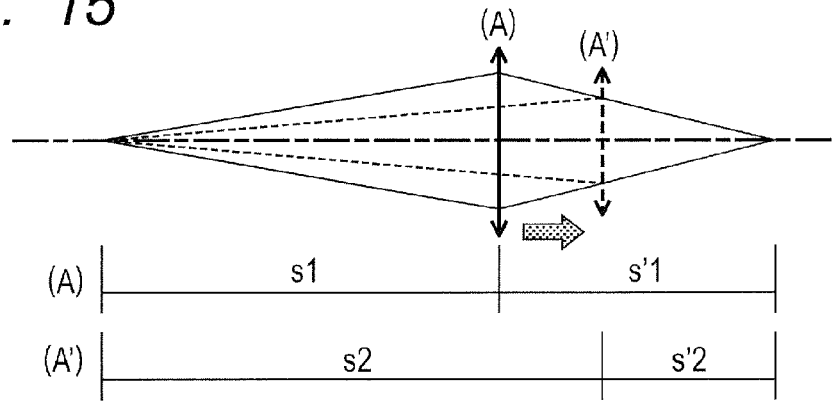
FIG. 15 is a schematic diagram of a combined lens of U3 and U4 at the zoom position fz.
Figure 16A:
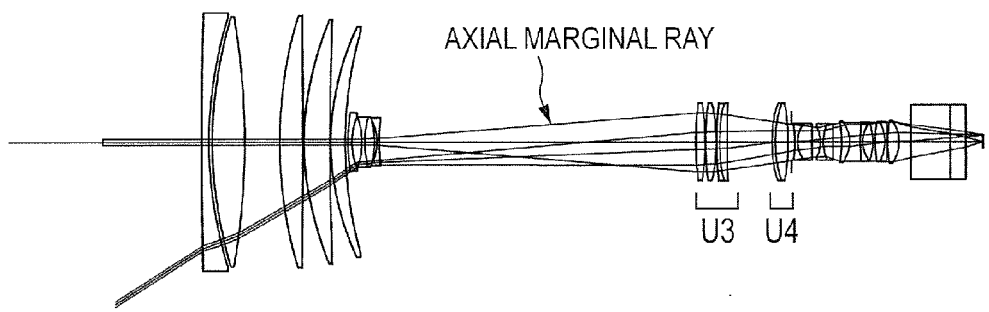
FIG. 16A is an optical path diagram at the wide-angle end.
Figure 16B:
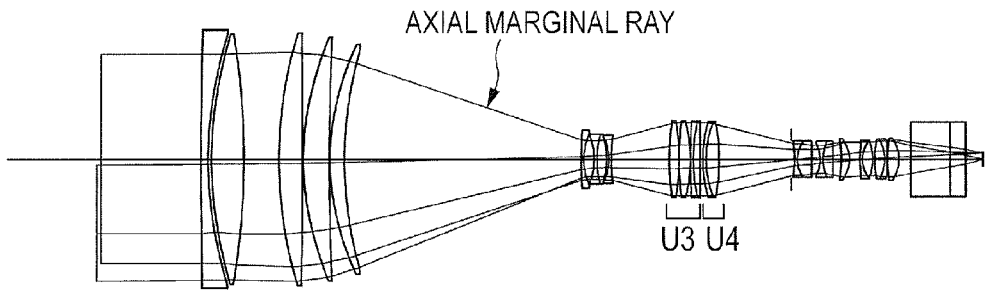
FIG. 16B is an optical path diagram in the vicinity of the zoom position fz.
Figure 16C:
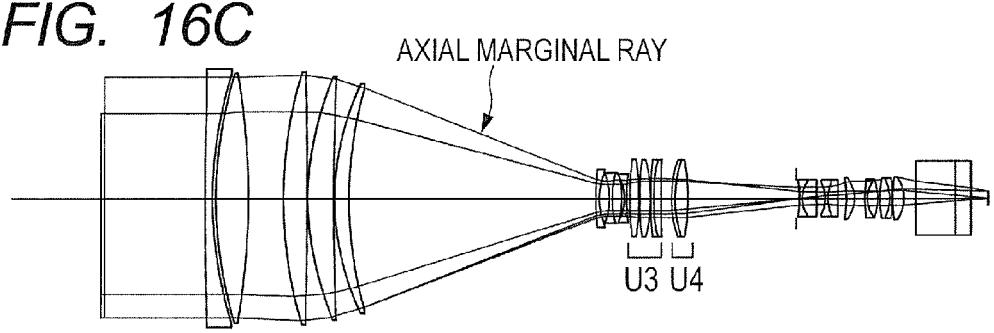
FIG. 16C is an optical path diagram at the telephoto end.
Figure 17:
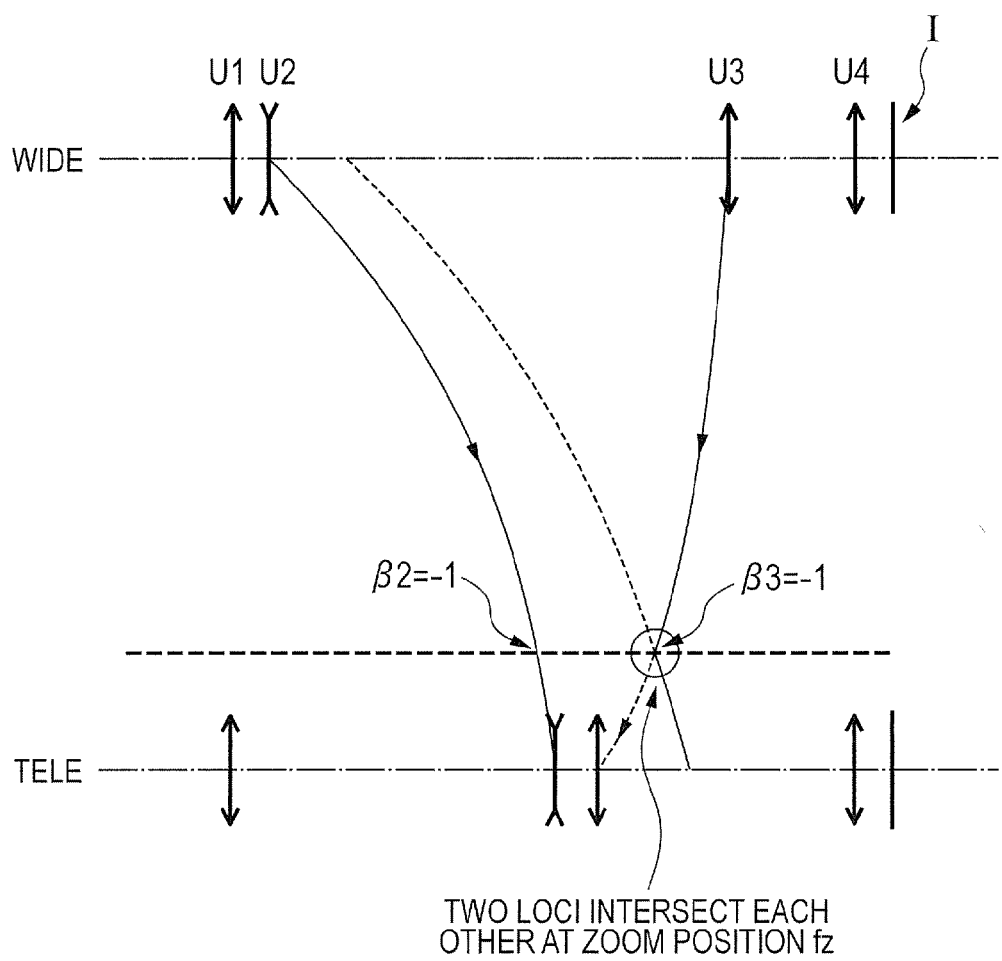
FIG. 17 is a schematic diagram of the paraxial refractive power arrangement of a transfer type zoom lens.
Figure 18:
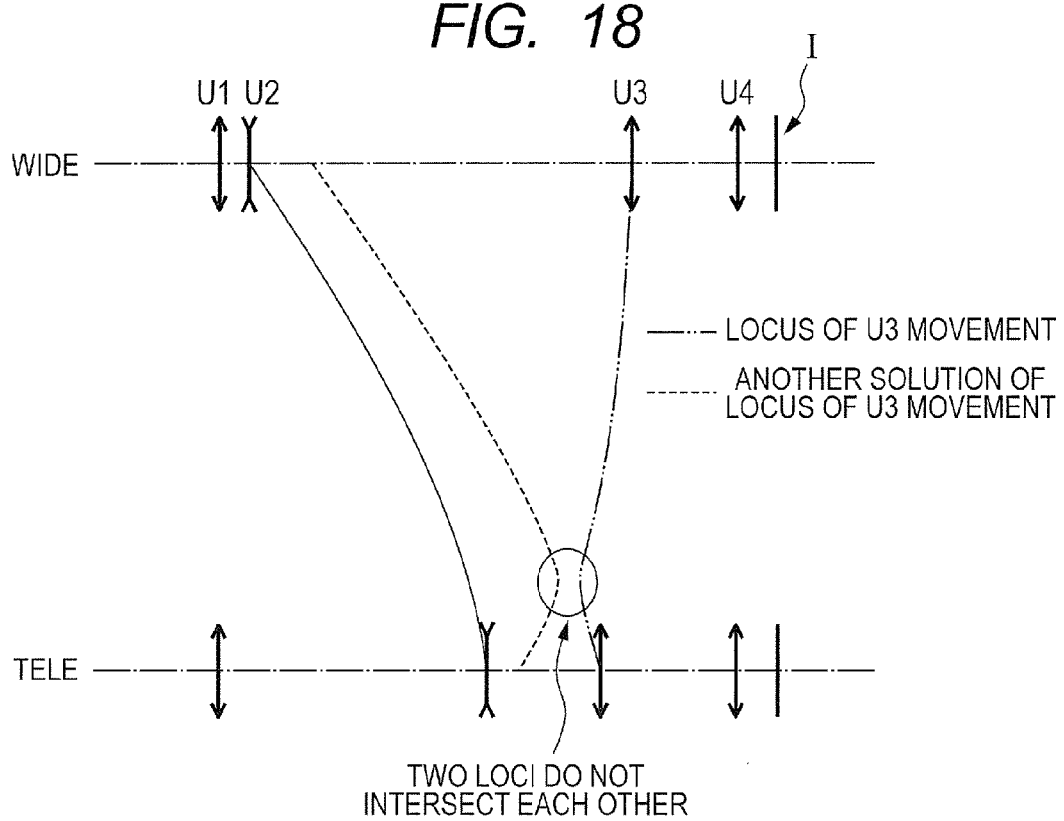
FIG. 18 is a schematic diagram of the paraxial refractive power arrangement of a four-unit zoom lens.
Figure 19:
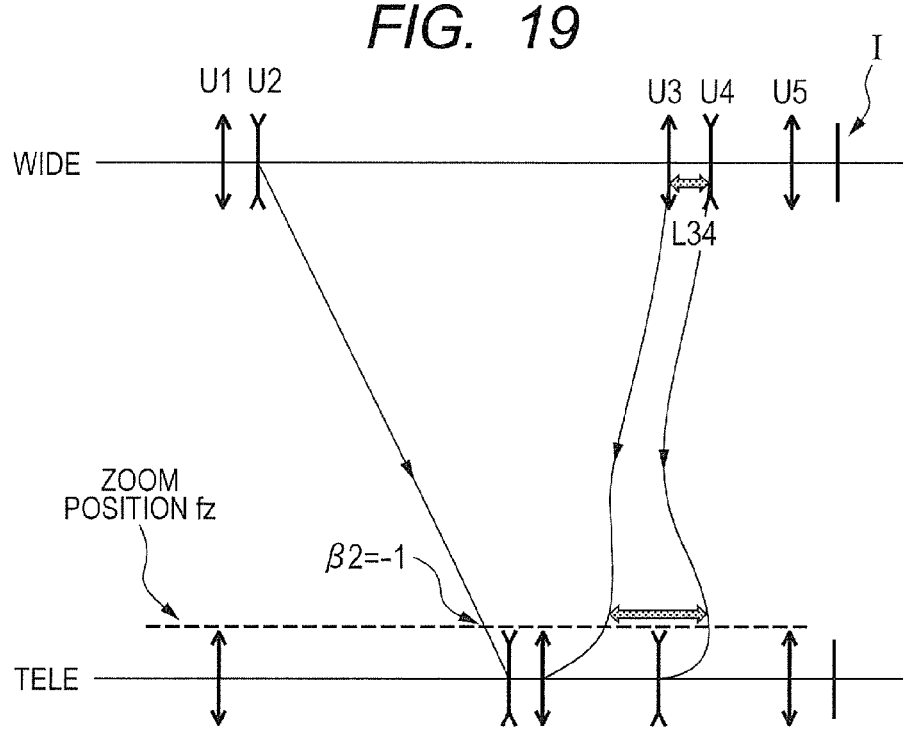
FIG. 19 is a schematic diagram of the paraxial refractive power arrangement of a zoom lens according to Embodiment 4 of the present invention.

FIG. 13 is a schematic diagram of a main part of an image pickup apparatus of the present invention. FIG. 14 is a schematic diagram of a paraxial refractive power arrangement of zoom lenses according to Embodiments 1 to 3, 5, and 6 of the present invention. FIG. 15 is a schematic diagram of a combined lens of the third lens unit U3 and the fourth lens unit U4 at the zoom position fz. FIGS. 16A, 16B, and 16C are optical path diagrams respectively at the wide-angle end, in the vicinity of the zoom position fz, and at the telephoto end. FIG. 17 is a schematic diagram of the paraxial refractive power arrangement of a transfer type zoom lens. FIG. 18 is a schematic diagram of a paraxial refractive power arrangement of a four-unit zoom lens that does not satisfy a transfer condition. FIG. 19 is a schematic diagram of a paraxial refractive power arrangement of a zoom lens according to Embodiment 4 of the present invention.

In each lens cross-sectional view, the left side is a subject (object) side (front), and the right side is the image side (rear). In the lens cross-sectional view, a first lens unit (front lens unit) U1 has a positive refractive power and does not move for zooming. A focus lens unit U1b in the first lens unit U1 moves toward the object side when focusing from an infinite object to a close object. A fixed lens unit U1a or U1c in the first lens unit U1 does not move for focusing.

A second lens unit U2 having a negative refractive power moves during zooming. A third lens unit U3 having a positive refractive power moves during zooming. A fourth lens unit U4 having a positive or negative refractive power moves during zooming. A fifth lens unit (relay lens unit) U5 having a positive refractive power for the image-forming does not move for zooming.

The zoom lens of each embodiment moves on an optical axis while changing the intervals among the second lens unit U2 to the fourth lens unit U4/and hence scorning and correction of image plane variation due to the zooming are performed.

These three lens units (the second lens unit U2 to the fourth lens unit U4) constitute a zoom, system (magnification-varying unit). The zoom lens further includes a stop (aperture stop) SP. P represents a color separation prism P, an optical filter or the like and is illustrated as a glass block in the figures. An image pickup surface I corresponds to an image pickup surface of a solid-state image pickup element (photoelectric transducer) for receiving light of an image formed by the zoom lens and performing photoelectric conversion.

In the aberration graphs, a straight line and a two-dot dashed line of the spherical aberration graph indicate aberrations for an e-line and a g-line, respectively. A dotted line and a solid line in the astigmatism graph indicate aberrations on a meridional image plane and a sagittal image plane, respectively, and a lateral chromatic aberration graph illustrates an aberration on the g-line. A half angle of view is represented by $\omega$, and an F-number is represented by Fno. Note that, in the following Embodiments, a case where a magnification-varying lens unit is located at a shortest focal length side is referred to as the wide-angle end, and a case where a magnification-varying lens unit is located at a longest focal length side is referred to as the telephoto end.

FIG. 14 is a schematic diagram of a paraxial refractive power arrangement of zoom lenses according to Embodiments 1 to 3, 5, and 6 of the present invention, and illustrates moving loci of the second to fourth lens units U2 to U4 during zooming. In the diagram, the upper side is the wide-angle end (WIDE), and the lower side is the telephoto end (TELE). Solid lines from the upper side to the lower side indicate loci of the lens units along which the lens units move during zooming. In FIG. 14, the third lens unit U3 and the fourth lens unit U4 move so that a space L34 therebetween becomes large at the wide-angle end (WIDE), and becomes small in the vicinity of the zoom position fz where an imaging magnification of the second lens unit U2 becomes −1. In the diagram, the zoom position fz is indicated by a broken line.

FIG. 19 is a schematic diagram of a paraxial refractive power arrangement according to Embodiment 4 of the present invention. In FIG. 19, the third lens unit U3 and the fourth lens unit 134 move so that the space L34 therebetween becomes small at the wide-angle end (WIDE), and becomes large in the vicinity of the zoom position fz where the imaging magnification of the second lens unit U2 becomes −1.

FIGS. 16A, 16B, and 16C are optical path diagrams at the wide-angle end to the telephoto end in the present invention. FIG. 16A is the diagram at the wide-angle end, FIG. 16B is the diagram in the vicinity of the zoom position 12, and FIG. 16C is the diagram at the telephoto end. Two rays including an axial ray, and an off-axial ray corresponding to an outermost periphery of a screen are illustrated. As illustrated in FIG. 16B, an axial marginal ray passes through the third and fourth lens units U3 and U4 at highest positions in the vicinity of the zoom position fz.

In other words, the lens diameters of the third and fourth lens units U3 and U4 are determined in the vicinity of the zoom position fz.

FIG. 15 is a schematic diagram of a relationship between the lens diameter of the third and fourth lens units U3 and U4 and the light ray at the zoom position fz of the zoom lenses according to Embodiments of the present invention. In FIG. 15, the left side is the object side, and the right side is an image surface side. An arrow in FIG. 15 indicates a combined lens unit U34 of the third and fourth lens units U3 and U4. In the present invention, the lens diameter can be downsized by positioning the combined lens unit U34 on a broken line (A') rather than a solid line (A). In other words, in the condition of maintaining positions of object point and image point with respect to an imaging relationship of (A), and maintaining an image side F-number, the combined lens unit U34 is positioned on the image side (the right side) so that the lens diameter of the combined lens unit U34 is reduced.

On the other hand, an imaging magnification β can be generally expressed by the following expression:

$$\beta = s'/s \qquad (11),$$

where s represents a distance from the imaging point of the second lens unit to the combined lens U34, and s' represents a distance from the combined lens U34 to the image point of the combined lens U34.

Here, because s has a negative value, β also has a negative value.

In this case, imaging magnifications β1 and β2 of a solid line arrow (A) and a broken line arrow (A') are expressed by the following expressions.

$$\beta 1 = s'1/s1 \qquad (11a)$$

$$\beta 2 = s'2/s2 \qquad (11b)$$

Therefore, a relative relationship illustrated in FIG. 15 is expressed as follows.

$$|\beta 1| > |\beta 2| \qquad (11e)$$

In other words, when being positioned closer to the image side (the right side) as the broken line arrow (A'), the lens diameter of U34 is reduced, but the absolute value of the imaging magnification β is decreased.

In addition, FIG. 17 illustrates a paraxial schematic diagram of a four-unit zoom lens generally called a transfer type zoom lens that is a zoom lens advantageous for achieving a higher zoom ratio. The transfer type zoom lens is constituted of a first lens unit having a positive refractive power, a second lens unit having a negative refractive power that moves during zooming, a third lens unit having a positive refractive power that moves during zooming, and a fourth lens unit having a positive refractive power for imaging. In FIG. 17, the upper side is the wide-angle end (WIDE), and the lower side is the telephoto end (TELE) Solid lines from the upper side to the lower side indicate loci of the second lens unit U2 and the third lens unit U3 when the second lens unit U2 and the third lens unit U3 move during zooming. The transfer type zoom lens satisfies a condition that when the lateral magnification β2 of the second lens unit U2 is −1, the lateral magnification β3 of the third lens unit U3 becomes −1. Thus, the third lens unit U3 can continue to move in one way from the image side (the right side) toward the object side (the left side) during zooming. As a result, a variation of U3 during zooming can be increased, which is advantageous for achieving a higher zoom ratio.

Note that, FIG. 18 illustrates a paraxial schematic diagram of an ordinary four-unit zoom lens that does not satisfy this condition. As illustrated in FIG. 18, in the four-unit zoom lens, the third lens unit U3 that generally corrects the image point can move along two moving loci of a dashed double-dotted line and a broken line. The transfer type zoom lens illustrated in FIG. 17 is a special case of the zoom lens having the moving loci of the lens units illustrated in FIG. 18. When the above-mentioned condition is satisfied, the two moving loci intersect each other at one point so that it is possible to transfer from one of the two moving loci to the other moving locus at the intersection.

In each embodiment, the second lens unit U2 passes through a point at which the imaging magnification becomes −1 during zooming. Then, the following conditions are satisfied:

$$-1 < \beta 34 < -0.3 \qquad (1), \text{ and}$$

$$4.0 < |m2/m3| < 15 \qquad (2),$$

where β34 represents the imaging magnification of the combined lens unit U34 constituted of the third lens unit U3 and the fourth lens unit U4 when the zoom position where the imaging magnification of the second lens unit U2 becomes −1 is fz, and m2 and m3 respectively represent displacements, of the second lens unit U2 and the third lens unit U3 on an optical axis at the zoom position fz with reference to the wide-angle end.

In the zoom lens of each embodiment, the refractive powers of individual lens units, the moving loci during zooming, and the like are appropriately set. Here, the conditional expression (1) defines the imaging magnification β34 of the combined lens unit constituted of the third lens unit U3 and the fourth lens unit U4 at the zoom position fz where the imaging magnification β2 of the second lens unit U2 becomes −1. Thus, as understood from FIG. 15 and the expression (II), the combined lens unit U34 can be positioned closer to the image side (the right side). The combined lens unit U34 is positioned closer to the image side (the right side), and hence it becomes easy to reduce the lens diameters of the third and fourth lens units.

If the upper limit of the conditional expression (1) is not satisfied, shares of zooming of the third and fourth lens units are decreased so that it becomes difficult to achieve a higher zoom ratio. If the lower limit of the conditional expression (1) is not satisfied, a difference with the above-mentioned transfer type room lens is eliminated so that it becomes difficult to reduce the lens diameters of the third and fourth lens units.

The conditional expression (2) defines a ratio of the displacement between the second lens unit U2 and the third lens unit U3 at the zoom position fz with reference to the wide-angle end. As illustrated in FIG. 15, when the third and fourth lens units U34 are positioned at the image side (the right side), the lens diameter can be reduced. In this case, a displacement m3 of the third lens unit U3 from the wide-angle end to the zoom position fz is reduced. Then, a variation of lateral magnification of the third lens unit U3 from the wide-angle end to the zoom position fz is reduced, and hence it becomes difficult to achieve a higher zoom ratio. Therefore, the zoom ratio of the entire lens is maintained by increasing a displacement of the second lens unit U2 instead. In other words, by increasing a ratio of the share of zooming of the second lens unit U2, it becomes easy to reduce the lens diameters of the third and fourth lens units without decreasing the zoom ratio.

If the upper limit of the conditional expression (2) is not satisfied, a displacement of the third lens unit becomes so small that it becomes difficult to achieve a higher zoom ratio. If the lower limit of the conditional expression (2) is not satisfied, the displacement of the third lens unit is increased so that it becomes difficult to reduce the lens diameter.

It is more preferred to set the value range of the conditional expressions (1) and (2) as follows.

$$-0.96 < \beta 34 < -0.5 \qquad (1a)$$

$$5.0 < |m2/m3| < 13 \qquad (2a)$$

By satisfying the above-mentioned conditions, each of Embodiments of the present invention provides a small and light zoom lens in which aberrations are appropriately corrected over the entire zoom range.

In each embodiment, it is more preferred that the third lens unit U3 or the fourth lens unit U4 pass through a point at which the imaging magnification is −1 during zooming from the wide-angle end to the telephoto end. Thus, a variation of the lateral magnification of the third lens unit U3 or the fourth lens unit U4 is increased so that it becomes easy to achieve a higher zoom ratio.

A combined focal length F of the two lens units can be generally expressed by the following expression:

$$1/F=1/fa+1/fb-e/(fa*fb) \quad (12),$$

where fa represents one of two focal lengths of the two lens units, fb represents the other focal length, and e represents a principal point interval between two lens units.

Therefore, by increasing or decreasing the principal point interval e between the two lens units, it is possible to arbitrarily change the focal length of the combined lens.

In each Embodiment, it is more preferred that the following condition be satisfied:

$$0.95 < f34w/f34z < 1.50 \quad (3),$$

where f34w represents a combined focal length of the third lens unit U3 and the fourth lens unit U4 at the wide-angle end, and f34z represents a focal length of the combined lens unit constituted of the third lens unit U3 and the fourth lens unit U4 at the zoom position fz.

The conditional expression (3) defines a ratio of the focal length of the combined lens unit constituted of the third lens unit U3 and the fourth lens unit U4 between the wide-angle end and the zoom position fz.

As the focal length at the zoom position fz is set relatively smaller, the above-mentioned imaging magnification β34 becomes smaller, and it becomes easier to reduce lens diameters of the third lens unit U3 and the fourth lens unit U4. If the upper limit of the conditional expression (3) is not satisfied, a lens space between the third lens unit U3 and the fourth lens unit U4 at the wide-angle end or the zoom position fz becomes too large. Therefore, it becomes difficult to shorten the entire lens length. If the lower limit of the conditional expression (3) is not satisfied, the imaging magnification β34 is not decreased. Therefore, it becomes difficult to reduce the lens diameter.

It is more preferred to set the value range of the conditional expression (3) as follows.

$$1.06 < f34w/f34z < 1.30 \quad (3a)$$

In each Embodiment, it is more preferred to satisfy one or more of the following conditions:

$$1.5 < |ft/f1| < 5.0 \quad (4),$$

$$3.0 < |f1/f2| < 15.0 \quad (5), \text{ and}$$

$$2.0 < \beta 2wt/\beta 34wt < 7.0 \quad (6),$$

where f1 represents a focal length of the first lens unit U1, f2 represents a focal length of the second lens unit U2, ft represents a focal length of the telephoto end, β2wt represents a ratio of lateral magnification of the second lens unit U2 between the wide-angle end and the telephoto end, and β34 wt represents a ratio of combined lateral magnification of the combined lens unit U34 constituted of the third lens unit U3 and the fourth lens unit U4 between the wide-angle end and the telephoto end.

The conditional expression (4) defines a ratio between the focal length ft at the telephoto end and the focal length f1 of the first lens unit U1. If the upper limit of the conditional expression (4) is not satisfied, a magnification ratio of the first lens unit U1 at the telephoto end becomes too large. Therefore, it becomes difficult to correct spherical aberration variation and axial chromatic aberration on the telephoto side. If the lower limit of the conditional expression (4) is not satisfied, focal lengths of the second to fourth lens units U2 to U4 are apt to be short. Therefore, it becomes difficult to suppress aberration variation due to zooming.

The conditional expression (5) defines a ratio between the focal length f1 of the first lens unit U1 and the focal length f2 of the second lens unit U2. If the upper limit of the conditional expression (5) is not satisfied, the focal length of the first lens unit U1 becomes relative large. Therefore, it becomes difficult to achieve a wider angle of view because the lens diameter of the first lens unit U1 is increased. If the lower limit of the conditional expression (5) is not satisfied, the focal length of the first lens unit U1 becomes relatively short. Therefore, it becomes difficult to correct the spherical aberration variation and the axial chromatic aberration on the telephoto side.

The conditional expression (6) defines a ratio between the ratio β2wt of the lateral magnification of the second lens unit U2 between the wide-angle end and the telephoto end, and the ratio β34 wt of the combined lateral magnification of the combined lens unit U34 constituted of the third lens unit U3 and the fourth lens unit U4 between the wide-angle end and the telephoto end. The product of β2wt and β34wt indicates a zoom ratio of the entire lens system, and hence it can also be said that the conditional expression (6) defines share ratios of the zoom ratio. If the upper limit of the conditional expression (6) is not satisfied, a ratio that the combined lens U34 contributes to the aberration correction on the telephoto side is small. Therefore, it becomes difficult to correct the axial chromatic aberration on the telephoto side. If the lower limit of the conditional expression (6) is not satisfied, a share of zooming by the second lens unit U2 becomes small. Therefore, it becomes difficult to reduce the entire lens length and the lens diameters of the third lens U3 and the fourth lens U4.

In each Embodiment, it is preferred that the fourth lens unit U4 have at least one surface constituted of an aspherical surface. When the aspherical surface of the fourth lens unit U4 is applied to a surface having a positive refractive power, it is preferred that the surface have such a shape that the positive refractive power is decreased toward a periphery from an intersection of the optical axis and the aspherical surface. When the aspherical surface of the fourth lens unit U4 is applied to a surface having a negative refractive power, it is preferred that the surface have such a shape that the negative refractive power is increased toward the periphery from the intersection of the optical axis and the aspherical surface, with this structure, it becomes easy to correct aberration variation during zooming, namely spherical aberration, field curvature, and coma on the wide-angle side in particular. Thus, the structure is advantageous for achieving a wider angle of view.

In each Embodiment, it is more preferred to satisfy one or more of the following expressions:

$$0.1 < |f3/f4| < 1.0 \quad (7),$$

$$1.5 \times 10^{-3} < |\Delta 10/fw| < 2.0 \times 10^{-1} \quad (8),$$

$$5.0 \times 10^{-4} < |\Delta 9/fw| < 1.0 \times 10^{-1} \quad (9), \text{ and}$$

$$5.0 \times 10^{-5} < |\Delta 7/fw| < 3.0 \times 10^{-2} \quad (10),$$

where f3 represents a focal length of the third lens unit, f4 represents a focal length of the fourth lens unit, Δ10, Δ9, and Δ7 respectively represent aspheric amounts at 100%, 90%, and 70% of an effective diameter of the a spherical surface of the fourth lens unit, and fw represents a focal length at the wide-angle end. Here, the aspheric amount is expressed as a difference in the optical axis direction relative to the spherical surface which has a curvature at a paraxial position and contacts with the lens surface at the intersection of the optical axis and the lens surface.

The conditional expression (7) defines a focal length ratio between the third lens unit U3 and the fourth lens unit U4. If the upper limit of the conditional expression (7) is not satisfied, the focal length of the third lens unit U3 becomes relatively too long. Therefore, it becomes difficult to zoom effectively, and the entire lens length is increased. If the lower limit of the conditional expression (7) is not satisfied, a focal length of the fourth lens unit U4 becomes relatively too long. Therefore, it becomes difficult to reduce the lens diameter.

The conditional expressions (8) to (10) define aspheric amounts at 100%, 90%, and 70% of the effective diameter of the aspherical surface of the fourth lens unit U4, and indicates a shape difference from a spherical surface defined as a paraxial surface. When the aspherical surface of the fourth lens unit U4 has a shape satisfying the conditional expressions (8) to (10), a larger effect can be obtained.

It is more preferred to set the value ranges of the conditional expressions (4) to (10) as follows.

$$3.0 < |ft/f1| < 4.5 \quad (4a)$$

$$9.3 < |f1/f2| < 13.0 \quad (5a)$$

$$3.0 < \beta wt/\beta 34wt < 6.0 \quad (6a)$$

$$0.2 < |\beta 3/f4| < 0.7 \quad (7a)$$

$$2.0 \times 10^{-3} < |\Delta 10/fw| < 3.5 \times 10^{-2} \quad (8a)$$

$$1.0 \times 10^{-3} < |\Delta 9/fw| < 2.5 \times 10^{-2} \quad (9a)$$

$$1.0 \times 10^{-4} < |\Delta 7/fw| < 1.0 \times 10^{-2} \quad (10a)$$

In each Embodiment, it is preferred that the fourth lens unit U4 be constituted of at least one positive lens and at least one negative lens. With this structure, it becomes easy to suppress aberration variations during zooming, in particular, to correct axial chromatic aberration and lateral chromatic aberration.

Next, features of a lens configuration of each Embodiment are described.

In Embodiment 1, the first lens unit U1 corresponds to the first lens surface to the tenth lens surface. The second lens unit U2 corresponds to the eleventh lens surface to the seventeenth lens surface. The third lens unit U3 corresponds to the eighteenth lens surface to the twenty-fourth lens surface. The fourth lens unit U4 corresponds to the twenty-fifth lens surface to the twenty-seventh lens surface.

When the second lens unit U2 moves linearly toward the image side during zooming from the wide-angle end to the telephoto end, the third lens unit U3 and the fourth lens unit 134 move generally from the image side toward the object side along a non-linear locus in the middle of zooming.

A third zoom position among the four zoom positions is the vicinity of the zoom position fz (f340 mm), and the imaging magnification β2 of the second lens unit is −1.25 that is close to −1. With this focal length, the lens diameters of the third and fourth lens units U3 and U4 are determined.

The eleventh lens surface, the nineteenth lens surface, and the twenty-seventh lens surface have an aspherical shape. The eleventh lens surface corrects a distortion mainly on the wide-angle side. The nineteenth lens surface and the twenty-seventh lens surface correct an off-axial aberration such as a coma on the wide-angle side and a spherical aberration on the telephoto side.

As shown in Table 1 below, Numerical Embodiment 1 satisfies all the conditional expressions (1) to (10). Embodiment 1 achieves a wider angle of view having a higher zoom ratio of 100 and a photographing field angle (field angle) of 62.9 degrees at the wide-angle end. Further, in the entire zoom range, high optical performance is obtained in which various aberrations are appropriately corrected.

In Embodiment 2, the first lens unit U1 corresponds to the first lens surface to the tenth lens surface. The second lens unit U2 corresponds to the eleventh lens surface to the seventeenth lens surface. The third lens unit U3 corresponds to the eighteenth lens surface to the twenty-fourth lens surface. The fourth lens unit U4 corresponds to the twenty-fifth lens surface and the twenty-sixth lens surface.

When the second lens unit U2 moves linearly toward the image side during zooming from the wide-angle end to the telephoto end, the third lens unit U3 moves generally from the image side toward the object side along a non-linear locus in the middle of zooming. The fourth lens unit U4 moves once toward the image side in the middle of zooming for correcting aberration variation on the wide-angle side, and then moves generally from the image side toward the object side along a non-linear locus.

A third zoom position among the four zoom positions is the vicinity of the zoom position fz (f=300 mm), and the imaging magnification B2 of the second lens unit is −1.12 that is close to −1. With this focal length, the lens diameters of the third and fourth lens units U3 and U4 are determined.

The eleventh lens surface, the nineteenth lens surface, and the twenty-sixth lens surface have an aspherical shape. The eleventh lens surface corrects a distortion mainly on the wide-angle side. The nineteenth lens surface and the twenty-sixth lens surface correct an off-axial aberration such as a coma on the wide-angle side and a spherical aberration on the telephoto side.

As shown in Table 1 below, Numerical Embodiment 2 satisfies all the conditional expressions (1) to (10). Embodiment 2 achieves a wider angle of view having a higher zoom ratio of 100 and a photographing field angle (field angle) of 61.7 degrees at the wide-angle end. Further, in the entire zoom range, high optical performance is obtained in which various aberrations are appropriately corrected.

In Embodiment 3, the first lens unit U1 corresponds to the first lens surface to the tenth lens surface. The second lens unit U2 corresponds to the eleventh lens surface to the seventeenth lens surface. The third lens unit U3 corresponds to the eighteenth lens surface to the twenty-fourth lens surface. The fourth lens unit U4 corresponds to the twenty-fifth lens surface to the twenty-eighth lens surface.

When the second lens unit U2 moves linearly toward the image side during zooming from the wide-angle end to the telephoto end, the third lens unit U3 moves generally from the image side toward the object side along a non-linear locus in the middle of zooming. The fourth lens unit U4 moves once toward the image side in the middle of zooming for correcting aberration variation on the wide-angle side. The fourth lens unit U4 then moves generally from the image side toward the object side along a non-linear locus and moves again toward the image side in the vicinity of the telephoto end.

A third zoom position among the four zoom positions is the vicinity of the zoom position ft (f300 mm), and the imaging magnification 62 of the second lens unit is −1.13 that is close to −1. With this focal length, the lens diameters of the third and fourth lens units U3 and U4 are determined.

The eleventh lens surface, the nineteenth lens surface, and the twenty-fifth lens surface have an aspherical shape. The eleventh lens surface corrects a distortion mainly on the wide-angle side. The nineteenth lens surface and the twenty-fifth lens surface correct an off-axial aberration such as a coma aberration on the wide-angle side and a spherical aberration on the telephoto side.

As shown in Table 1 below, Numerical Embodiment 3 satisfies all the conditional expressions (1) to (10). Embodiment 3 achieves a wider angle of view having a higher zoom ratio of 120 and a photographing field angle (field angle) of 63.4 degrees at the wide-angle end. Further, in the entire zoom range, high optical performance is obtained in which various aberrations are appropriately corrected.

In Embodiment 4, the first lens unit U1 corresponds to the first lens surface to the tenth lens surface. The second lens unit U2 corresponds to the eleventh lens surface to the seventeenth lens surface. The third lens unit U3 corresponds to the eighteenth lens surface to the twenty-sixth lens surface. The fourth lens unit U4 corresponds to the twenty-seventh lens surface to the twenty-ninth lens surface.

When the second lens unit U2 moves linearly toward the image side during zooming from the wide-angle end to the telephoto end, the third lens unit U3 moves generally from the image side toward the object side along a non-linear locus in the middle of zooming. The fourth lens unit U4 moves once to the object side in the middle of zooming for correcting aberration variation on the wide-angle side. The fourth lens unit U4 then moves toward the image side along a non-linear locus in the vicinity of the zoom position fz and moves again toward the object side in the vicinity of the telephoto end.

A third zoom position among the four zoom positions is the vicinity of the zoom position fz (f=245 mm), and the imaging magnification β2 of the second lens unit is −1.12 that is close to −1. With this focal length, the lens diameters of the third and fourth lens units U3 and U4 are determined.

The eleventh lens surface, the nineteenth lens surface, and the twenty-sixth lens surface have an aspherical shape. The eleventh lens surface corrects a distortion mainly on the wide-angle side. The nineteenth lens surface and the twenty-sixth lens surface correct an off-axial aberration such as a coma aberration on the wide-angle side and a spherical aberration on the telephoto side.

As shown in Table 1 below, Numerical Embodiment 4 satisfies all the conditional expressions (1) to (10). Embodiment 4 achieves a wider angle of view having a higher zoom ratio of 100 and a photographing field angle (field angle) of 65.2 degrees at the wide-angle end. Further, in the entire zoom range, high optical performance is obtained in which various aberrations are appropriately corrected.

In Embodiment 5, the first lens unit U1 corresponds to the first lens surface to the nineteenth lens surface. The second lens unit U2 corresponds to the twentieth lens surface to the twenty-sixth lens surface. The third lens unit U3 corresponds to the twenty-seventh lens surface to the thirty-third lens surface. The fourth lens unit U4 corresponds and the thirty-fourth lens surface to the thirty-fifth lens surface.

When the second lens unit U2 moves linearly toward the image side during, zooming from the wide-angle end to the telephoto end, the third lens unit U3 moves generally from the image side toward the object side along a non-linear locus in the middle of zooming. The fourth lens unit U4 moves generally from the image side toward the object side along a non-linear locus and moves to the image side in the vicinity of the telephoto end.

A third zoom position among the four zoom positions is the vicinity of the zoom position fz (f=124 mm), and the imaging magnification β2 of the second lens unit is −1.73 that is close to −1. With this focal length, the lens diameters of the third and fourth lens units U3 and U4 are determined.

The twentieth lens surface, the twenty-eighth lens surface, and the thirty-fourth lens surface have an aspherical shape. The twentieth lens surface corrects a distortion mainly on the wide-angle side. The twenty-eighth lens surface and the thirty-fourth lens surface correct an off-axial aberration such as a coma aberration on the wide-angle side and a spherical aberration on the telephoto side.

As shown in Table 1 below, Numerical Embodiment 5 satisfies all the conditional expressions (1) to (10). Embodiment 5 achieves a wider angle of view having a higher zoom ratio of 26 and a photographing field angle (field angle) of 78.3 degrees at the wide-angle end. Further, in the entire zoom range, high optical performance is obtained in which various aberrations are appropriately corrected.

In Embodiment 6, the first lens unit U1 corresponds to the first lens surface to the twelfth lens surface. The second lens unit U2 corresponds to the thirteenth lens surface to the nineteenth lens surface. The third lens unit U3 corresponds to the twentieth lens surface to the twenty-third lens surface. The fourth lens unit U4 corresponds to the twenty-fourth lens surface to the thirtieth lens surface.

When the second lens unit U2 moves linearly toward the image side during zooming from the wide-angle end to the telephoto end, the third lens unit U3 moves once toward the image side in the middle of zooming for correcting aberration variation on the wide-angle side, and then moves toward the object side along a non-linear locus. The fourth lens unit U4 moves generally from the image side toward the object side along a non-linear locus in the middle of zooming.

A third zoom position among the four zoom positions is the vicinity of the zoom position fz (f=280 mm), and the imaging magnification β2 of the second lens unit is −1.09 that is close to −1. With this focal length, the lens diameters of the third and fourth lens units U3 and U4 are determined.

As shown in Table 1 below, Numerical Embodiment 6 satisfies all the conditional expressions (1) to (6). Embodiment 6 achieves a wider angle of view having a higher zoom ratio of 90 and a photographing field angle (field angle) of 63.4 degrees at the wide-angle end. Further, in the entire zoom range, high optical performance is obtained in which various aberrations are appropriately corrected.

As described above, according to each Embodiment, the refractive power arrangement of each lens unit, the moving locus of the moving lens unit for varying magnification, and the like are appropriately defined. Thus, it is possible to obtain a zoom lens having a higher zoom ratio and a wider angle of view, in which various aberrations are appropriately corrected.

FIG. 13 is a schematic diagram of a main part of an image pickup apparatus (TV camera system) employing the zoom lens of Embodiments 1 to 6 as an imaging optical system. FIG. 13 illustrates a zoom lens 101 according to any one of Embodiments 1 to 3 and a camera 124. The zoom lens 101 can be mounted/removed onto/from the camera 124. The zoom lens 101 is mounted onto the camera 124 to form an image pickup apparatus 125. The zoom lens 101 includes a first lens unit F, a magnification-varying portion LZ, and a fifth lens unit R for image formation. The first lens unit F includes a focus lens unit.

The magnification-varying portion LZ includes a second lens unit which moves on the optical axis for varying magnification, a third lens unit which moves on the optical axis for correcting an image plane variation due to magnification-varying, and the fifth lens unit R. An aperture stop is represented by SP. The fifth, lens unit R includes lens units IE' and IE that can be inserted/removed into/from an optical path. Through exchange of the lens units IE and IE', a focal length range of the entire system of the scorn lens 101 is changed. The zoom lens 101 also includes driving mechanisms 114 and 115, such as helicoids and cams, for driving in the optical axis direction the first lens unit F and the zooming portion LZ, respectively.

The image pickup apparatus 125 includes motors (driving units) 116 to 118 for electrically driving the driving mechanisms 114 and 115 and the aperture stop SP. The image pickup apparatus 125 also includes detectors 119 to 121, such as an encoder, a potentiometer, or a photo-sensor, which are configured to detect the positions of the first lens unit F and the zooming portion LZ on the optical axis, and the aperture diameter of the aperture stop SP. In addition, the camera 124 includes a glass block 109, which corresponds to an optical filter or a color separating optical system inside the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive an object image formed by the zoom lens 101.

Further, central processing units (CPUs) 111 and 122 control various types of driving of the camera 124 and the zoom lens 101, respectively. Through application of the zoom lens according to the present invention to a TV camera as described above, an image pickup apparatus having high optical performance is implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Now, numerical Embodiments 1 to 6, corresponding to Embodiments 1 to 6 of the present invention, are described. In each of Numerical Embodiments, "i" represents an order of a surface from the object side, "ri" represents a curvature radius of an i-th surface from the object side, "di" represents an interval between the i-th surface and the (i+1)th surface from the object side, and "ndi" and "vdi" respectively represent a refractive index and an Abbe constant of the i-th optical member. An aspherical surface is represented by next to the surface number. Three surfaces closest to the image side are a glass block, such as a filter. Table 1 shows correspondences between each Embodiment and the conditional expressions described above.

The aspherical shape is expressed in the following condition:

$$X = \frac{H^2/R}{1+\sqrt{1-(1+k)(H/R)^2}} + A4H^4 + A6H^6 + A8H^8 + A10H^{10} + A12H^{12}$$

where an X axis corresponds to the optical axis, an H axis corresponds to an axis perpendicular to the optical axis, a traveling direction of light corresponds to a positive direction, "H" represents a paraxial curvature radius, "k" represents a conic constant, "A4", "A6", "A8", "A10", and "A12" each represent an aspherical coefficient, and "e-Z" means "$\times 10^{-Z}$".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-232783, filed Oct. 24, 2011, which is hereby incorporated by reference herein in its entirety.

Numerical Embodiment 1
Unit: mm

Surface data

| Surface No. | r | d | nd | vd | Effective diameter |
|---|---|---|---|---|---|
| 1 | 5434.024 | 6.00 | 1.83400 | 37.2 | 210.01 |
| 2 | 356.636 | 2.14 | | | 202.24 |
| 3 | 360.442 | 27.02 | 1.43387 | 95.1 | 201.95 |
| 4 | −580.457 | 28.08 | | | 201.30 |
| 5 | 339.842 | 20.28 | 1.43387 | 95.1 | 204.28 |
| 6 | −3786.156 | 0.25 | | | 203.80 |
| 7 | 253.961 | 20.83 | 1.43387 | 95.1 | 198.55 |
| 8 | 2001.569 | 1.20 | | | 197.27 |
| 9 | 216.571 | 12.49 | 1.49700 | 81.5 | 186.08 |
| 10 | 372.539 | (Variable) | | | 184.00 |
| 11* | −73071.610 | 2.20 | 2.00330 | 28.3 | 46.74 |
| 12 | 56.188 | 8.60 | | | 41.64 |
| 13 | −63.326 | 1.40 | 1.83400 | 37.2 | 40.46 |
| 14 | 62.711 | 8.69 | 1.95906 | 17.5 | 39.57 |
| 15 | −66.787 | 1.52 | | | 39.18 |
| 16 | −51.490 | 1.60 | 1.88300 | 40.8 | 38.36 |
| 17 | 226.272 | (Variable) | | | 37.87 |
| 18 | 211.694 | 7.53 | 1.59522 | 67.7 | 65.86 |
| 19* | −243.068 | 0.50 | | | 66.54 |
| 20 | 273.486 | 8.73 | 1.59522 | 67.7 | 67.64 |
| 21 | −147.447 | 0.20 | | | 67.80 |
| 22 | 778.098 | 2.50 | 1.84666 | 23.8 | 66.86 |
| 23 | 120.295 | 6.01 | 1.43875 | 94.9 | 65.94 |
| 24 | 1046.365 | (Variable) | | | 65.90 |
| 25 | 104.799 | 2.50 | 1.84666 | 23.8 | 65.87 |
| 26 | 76.714 | 11.02 | 1.59522 | 67.7 | 64.57 |
| 27* | −169.484 | (Variable) | | | 64.36 |
| 28 (Stop) | ∞ | 2.37 | | | 29.37 |
| 29 | −89.031 | 2.00 | 1.81600 | 46.6 | 28.70 |
| 30 | 21.194 | 11.91 | 1.84666 | 23.8 | 27.51 |
| 31 | −737.351 | 7.79 | | | 26.36 |
| 32 | −31.368 | 2.00 | 1.88300 | 40.8 | 24.44 |
| 33 | 32.366 | 8.64 | 1.62041 | 60.3 | 26.00 |
| 34 | −234.071 | 6.76 | | | 28.28 |
| 35 | −130.695 | 6.67 | 1.58913 | 61.1 | 32.06 |
| 36 | −28.050 | 9.16 | | | 33.11 |
| 37 | 319.523 | 2.00 | 1.88300 | 40.8 | 32.00 |
| 38 | 26.268 | 8.59 | 1.51823 | 58.9 | 31.41 |
| 39 | −45.531 | 2.03 | | | 31.56 |
| 40 | 126.095 | 8.61 | 1.48749 | 70.2 | 31.72 |
| 41 | −27.345 | 2.00 | 1.88300 | 40.8 | 31.55 |
| 42 | −189.854 | 0.20 | | | 33.06 |
| 43 | 218.321 | 9.40 | 1.53172 | 48.8 | 33.53 |
| 44 | −30.454 | 10.00 | | | 34.23 |
| 45 | ∞ | 33.00 | 1.60859 | 46.4 | 60.00 |
| 46 | ∞ | 13.20 | 1.51633 | 64.2 | 60.00 |
| 47 | ∞ | 15.08 | | | 60.00 |
| Image plane | ∞ | | | | |

Aspherical surface data

Eleventh surface

K = 1.69407e+006  A4 = 7.95307e−007   A6 = −9.70819e−011   A8 = 2.85357e−013

Nineteenth surface

K = −1.45313e+001  A4 = 1.51572e−007   A6 = 2.29624e−011   A8 = −3.73351e−015

Twenty-seventh surface

| K = 7.92880e+000 | A4 = 4.02021e−007 | A6 = 2.13607e−011 | A8 = 1.56802e−014 |
|---|---|---|---|

Various data
Zoom ratio 100.00

| | | | | |
|---|---|---|---|---|
| Focal length | 9.00 | 90.00 | 340.00 | 900.00 |
| F-number | 1.80 | 1.80 | 1.80 | 4.50 |
| Half angle of view | 31.43 | 3.50 | 0.93 | 0.35 |
| Image height | 5.50 | 5.50 | 5.50 | 5.50 |
| Entire lens length | 649.62 | 649.62 | 649.62 | 649.62 |
| d10 | 2.78 | 160.51 | 196.97 | 206.13 |
| d17 | 263.53 | 90.38 | 48.02 | 2.12 |
| d24 | 37.64 | 13.89 | 2.16 | 9.45 |
| d27 | 3.00 | 42.16 | 59.79 | 89.26 |
| Entrance pupil position | 133.88 | 1069.84 | 3786.28 | 13226.53 |
| Exit pupil position | 162.00 | 162.00 | 162.00 | 162.00 |
| Front principal point position | 143.43 | 1214.97 | 4913.10 | 19639.68 |
| Rear principal point position | 6.08 | −74.92 | −324.92 | −884.92 |

Imaging magnification of each lens unit

| | | | | |
|---|---|---|---|---|
| β1 | 0.00 | 0.00 | 0.00 | 0.00 |
| β2 | −0.12 | −0.44 | −1.25 | −2.32 |
| β3 | −0.61 | −4.84 | −69.67 | 6.50 |
| β4 | 0.48 | 0.16 | 0.01 | −0.23 |
| β5 | 0.98 | 0.98 | 0.98 | 0.98 |

Zoom lens unit data

| Unit | First surface | Focal length | Lens structure length | Front principal point position | Rear principal point position |
|---|---|---|---|---|---|
| 1 | 1 | 268.44 | 118.28 | 68.00 | −19.95 |
| 2 | 11 | −24.98 | 24.01 | 6.61 | −9.08 |
| 3 | 18 | 115.10 | 25.47 | 3.39 | −13.00 |
| 4 | 25 | 121.89 | 13.52 | 3.00 | −5.41 |
| 5 | 28 | 39.60 | 146.32 | 54.10 | 14.31 |

Single lens data

| Lens | Leading surface | Focal length |
|---|---|---|
| 1 | 1 | −455.00 |
| 2 | 3 | 515.72 |
| 3 | 5 | 718.03 |
| 4 | 7 | 666.31 |
| 5 | 9 | 1010.88 |
| 6 | 11 | −55.50 |
| 7 | 13 | −37.35 |
| 8 | 14 | 34.42 |
| 9 | 16 | −47.10 |
| 10 | 18 | 190.61 |
| 11 | 20 | 161.64 |
| 12 | 22 | −166.71 |
| 13 | 23 | 308.40 |
| 14 | 25 | −349.12 |
| 15 | 26 | 89.92 |
| 16 | 29 | −20.70 |
| 17 | 30 | 24.27 |
| 18 | 32 | −17.67 |
| 19 | 33 | 46.23 |
| 20 | 35 | 58.96 |
| 21 | 37 | −32.33 |
| 22 | 38 | 33.38 |
| 23 | 40 | 46.80 |
| 24 | 41 | −36.18 |
| 25 | 43 | 50.69 |
| 26 | 45 | 0.00 |
| 27 | 46 | 0.00 |

Numerical Embodiment 2
Unit: mm
Surface data

| Surface No. | r | d | nd | vd | Effective diameter |
|---|---|---|---|---|---|
| 1 | 5635.882 | 6.00 | 1.83400 | 37.2 | 199.24 |
| 2 | 353.577 | 2.16 | | | 192.06 |
| 3 | 357.636 | 24.50 | 1.43387 | 95.1 | 191.58 |
| 4 | −599.489 | 27.41 | | | 190.28 |
| 5 | 327.800 | 18.20 | 1.43387 | 95.1 | 188.22 |
| 6 | −3686.564 | 0.25 | | | 187.77 |
| 7 | 253.142 | 18.22 | 1.43387 | 95.1 | 183.58 |
| 8 | 2007.948 | 1.20 | | | 182.40 |
| 9 | 210.029 | 12.50 | 1.49700 | 81.5 | 173.10 |
| 10 | 361.355 | (Variable) | | | 170.49 |
| 11* | 2062.075 | 2.20 | 2.00330 | 28.3 | 49.48 |
| 12 | 59.879 | 8.87 | | | 44.29 |
| 13 | −70.845 | 1.40 | 1.83400 | 37.2 | 43.12 |
| 14 | 75.853 | 8.78 | 1.95906 | 17.5 | 42.08 |
| 15 | −68.537 | 1.63 | | | 41.66 |
| 16 | −53.210 | 1.60 | 1.88300 | 40.8 | 40.65 |
| 17 | 225.336 | (Variable) | | | 40.03 |
| 18 | 144.669 | 9.06 | 1.59522 | 67.7 | 72.44 |
| 19* | −377.267 | 0.50 | | | 72.95 |
| 20 | 146.629 | 12.13 | 1.59522 | 67.7 | 74.36 |
| 21 | −171.984 | 0.20 | | | 74.16 |
| 22 | 170.682 | 2.50 | 1.84666 | 23.8 | 71.19 |
| 23 | 69.148 | 13.56 | 1.43875 | 94.9 | 68.12 |
| 24 | −243.284 | (Variable) | | | 67.68 |
| 25 | 182.392 | 5.42 | 1.49700 | 81.5 | 64.48 |
| 26* | −3965.680 | (Variable) | | | 63.49 |
| 27 (Stop) | ∞ | 2.83 | | | 27.64 |
| 28 | −57.507 | 2.00 | 1.81600 | 46.6 | 26.87 |
| 29 | 26.658 | 5.40 | 1.84666 | 23.8 | 26.19 |
| 30 | −232.315 | 12.46 | | | 26.00 |
| 31 | −31.306 | 2.00 | 1.88300 | 40.8 | 22.62 |
| 32 | 61.401 | 5.00 | | | 23.91 |
| 33 | −562.689 | 8.09 | 1.58913 | 61.1 | 26.91 |
| 34 | −23.800 | 4.29 | | | 28.67 |
| 35 | 260.887 | 2.00 | 1.88300 | 40.8 | 28.37 |
| 36 | 24.088 | 7.51 | 1.51823 | 58.9 | 27.96 |
| 37 | −40.977 | 2.00 | | | 28.11 |
| 38 | 230.094 | 7.04 | 1.48749 | 70.2 | 28.33 |
| 39 | −24.102 | 2.00 | 1.88300 | 40.8 | 28.31 |
| 40 | −109.299 | 0.20 | | | 30.32 |
| 41 | 239.781 | 7.61 | 1.53172 | 48.8 | 31.17 |
| 42 | −27.214 | 10.00 | | | 31.69 |
| 43 | ∞ | 33.00 | 1.60859 | 46.4 | 60.00 |
| 44 | ∞ | 13.20 | 1.51633 | 64.2 | 60.00 |
| 45 | ∞ | 9.89 | | | 60.00 |
| Image plane | ∞ | | | | |

Aspherical surface data

Eleventh surface

| K = −1.55231e+004 | A4 = 8.79933e−007 | A6 = −3.86133e−010 | A8 = 4.36989e−013 |
|---|---|---|---|

Nineteenth surface

| K = −1.16078e+002 | A4 = 1.69044e−007 | A6 = 7.45097e−011 | A8 = −1.00747e−014 |
|---|---|---|---|

Twenty-sixth surface

| K = −3.57452e+002 | A4 = −8.80238e−009 | A6 = 6.35532e−011 | A8 = −2.44548e−014 |
|---|---|---|---|

Various data
Zoom ratio 100.00

| | | | | |
|---|---|---|---|---|
| Focal length | 9.20 | 92.00 | 300.00 | 920.00 |
| F-number | 1.80 | 1.80 | 1.80 | 5.00 |
| Half angle of view | 30.87 | 3.42 | 1.05 | 0.34 |
| Image height | 5.50 | 5.50 | 5.50 | 5.50 |
| Entire lens length | 617.62 | 617.62 | 617.62 | 617.62 |
| d10 | 2.74 | 152.49 | 187.66 | 200.52 |
| d17 | 280.97 | 99.09 | 54.61 | 1.99 |
| d24 | 15.00 | 19.77 | 1.84 | 30.24 |
| d26 | 3.00 | 30.36 | 57.60 | 68.97 |
| Entrance pupil position | 131.16 | 975.88 | 3036.42 | 13648.13 |
| Exit pupil position | 193.85 | 193.85 | 193.85 | 193.85 |
| Front principal point position | 140.82 | 1113.89 | 3825.64 | 19169.03 |
| Rear principal point position | 0.69 | −82.11 | −290.11 | −910.11 |

Imaging magnification of each lens unit

| | | | | |
|---|---|---|---|---|
| β1 | 0.00 | 0.00 | 0.00 | 0.00 |
| β2 | −0.13 | −0.46 | −1.12 | −2.36 |
| β3 | −0.29 | −0.92 | −1.37 | −2.09 |
| β4 | 0.85 | 0.77 | 0.69 | 0.66 |
| β5 | 1.07 | 1.07 | 1.07 | 1.07 |

Zoom lens unit data

| Unit | First surface | Focal length | Lens structure length | Front principal point position | Rear principal point position |
|---|---|---|---|---|---|
| 1 | 1 | 264.54 | 110.43 | 64.24 | −18.24 |
| 2 | 11 | −27.26 | 24.48 | 6.99 | −9.11 |
| 3 | 18 | 74.67 | 37.95 | 7.71 | −17.81 |
| 4 | 25 | 349.98 | 5.42 | 0.16 | −3.46 |
| 5 | 27 | 39.23 | 127.73 | 50.08 | 12.77 |

Single lens data

| Lens | Leading surface | Focal length |
|---|---|---|
| 1 | 1 | −449.70 |
| 2 | 3 | 519.02 |
| 3 | 5 | 693.05 |
| 4 | 7 | 663.86 |
| 5 | 9 | 979.28 |
| 6 | 11 | −60.99 |
| 7 | 13 | −43.46 |
| 8 | 14 | 38.19 |
| 9 | 16 | −48.34 |
| 10 | 18 | 176.21 |
| 11 | 20 | 134.42 |
| 12 | 22 | −137.51 |
| 13 | 23 | 124.06 |
| 14 | 25 | 349.98 |
| 15 | 28 | −21.97 |
| 16 | 29 | 28.24 |
| 17 | 31 | −22.98 |
| 18 | 33 | 41.79 |
| 19 | 35 | −30.00 |
| 20 | 36 | 30.35 |
| 21 | 38 | 45.01 |
| 22 | 39 | −35.20 |
| 23 | 41 | 46.20 |
| 24 | 43 | 0.00 |
| 25 | 44 | 0.00 |

Numerical Embodiment 3
Unit: mm
Surface data

| Surface No. | r | d | nd | vd | Effective diameter |
|---|---|---|---|---|---|
| 1 | 6797.000 | 6.00 | 1.83400 | 37.2 | 201.25 |
| 2 | 340.555 | 2.17 | | | 194.29 |
| 3 | 344.606 | 27.03 | 1.43387 | 95.1 | 195.03 |
| 4 | −526.417 | 25.45 | | | 195.61 |
| 5 | 317.115 | 18.91 | 1.43387 | 95.1 | 198.52 |
| 6 | 22370.550 | 0.25 | | | 198.01 |
| 7 | 252.030 | 19.58 | 1.43387 | 95.1 | 193.67 |
| 8 | 1642.450 | 1.20 | | | 192.44 |
| 9 | 210.802 | 14.00 | 1.49700 | 81.5 | 182.27 |
| 10 | 441.444 | (Variable) | | | 180.52 |
| 11* | −7064.012 | 2.20 | 2.00330 | 28.3 | 46.42 |
| 12 | 53.987 | 8.06 | | | 41.27 |
| 13 | −77.058 | 1.40 | 1.83481 | 42.7 | 40.18 |
| 14 | 50.599 | 7.76 | 1.95906 | 17.5 | 38.94 |
| 15 | −104.714 | 1.72 | | | 38.52 |
| 16 | −65.387 | 1.60 | 1.88300 | 40.8 | 37.93 |
| 17 | 176.819 | (Variable) | | | 37.36 |
| 18 | 211.530 | 8.67 | 1.61800 | 63.3 | 73.58 |
| 19* | −207.030 | 0.50 | | | 74.11 |
| 20 | 182.486 | 9.64 | 1.59201 | 67.0 | 75.37 |
| 21 | −204.977 | 0.20 | | | 75.26 |
| 22 | 183.204 | 2.50 | 1.80518 | 25.4 | 72.98 |
| 23 | 67.775 | 12.64 | 1.43875 | 94.9 | 69.96 |
| 24 | ∞ | (Variable) | | | 69.53 |
| 25* | 146.281 | 3.50 | 1.73800 | 32.3 | 68.24 |
| 26 | 90.207 | 0.18 | | | 66.36 |
| 27 | 89.841 | 9.07 | 1.65160 | 58.5 | 66.36 |
| 28 | −474.371 | (Variable) | | | 65.89 |
| 29 (Stop) | ∞ | 2.59 | | | 29.59 |
| 30 | −78.875 | 1.80 | 1.81600 | 46.6 | 28.80 |
| 31 | 28.184 | 5.34 | 1.80809 | 22.8 | 27.78 |
| 32 | 621.407 | 5.00 | | | 27.51 |
| 33 | −30.072 | 4.00 | 1.81600 | 46.6 | 27.13 |
| 34 | 51.831 | 14.31 | 1.54814 | 45.8 | 30.19 |
| 35 | −28.821 | 29.22 | | | 33.55 |
| 36 | −340.356 | 13.14 | 1.48749 | 70.2 | 34.79 |
| 37 | −39.135 | 0.20 | | | 35.33 |
| 38 | −93.018 | 3.80 | 1.83400 | 37.2 | 34.07 |
| 39 | 47.442 | 7.03 | 1.48749 | 70.2 | 33.56 |
| 40 | −54.654 | 4.37 | | | 33.70 |
| 41 | −3347.516 | 9.43 | 1.51742 | 52.4 | 32.56 |
| 42 | −31.015 | 1.54 | 1.88300 | 40.8 | 32.04 |
| 43 | −79.335 | 0.94 | | | 32.68 |
| 44 | 68.150 | 5.02 | 1.51742 | 52.4 | 33.03 |
| 45 | −82.110 | 15.00 | | | 32.88 |
| 46 | ∞ | 33.00 | 1.60859 | 46.4 | 60.00 |
| 47 | ∞ | 13.20 | 1.51633 | 64.2 | 60.00 |
| 48 | ∞ | 10.00 | | | 60.00 |
| Image plane | ∞ | | | | |

Aspherical surface data

Eleventh surface

K = −2.36774e+005   A4 = 5.62251e−007   A6 = 1.21054e−010   A8 = −1.11890e−013

Nineteenth surface

K = −2.02204e+001   A4 = −4.61496e−008   A6 = 4.15741e−011   A8 = −2.11496e−015

Twenty-fifth surface

K = 3.71110e+000   A4 = −1.10320e−007   A6 = −4.77366e−011   A8 = 5.69740e−015

Various data
Zoom ratio 120.00

| | | | | |
|---|---|---|---|---|
| Focal length | 8.90 | 97.50 | 300.00 | 1068.00 |
| F-number | 1.80 | 1.80 | 1.80 | 5.50 |
| Half angle of view | 31.72 | 3.23 | 1.05 | 0.30 |
| Image height | 5.50 | 5.50 | 5.50 | 5.50 |

-continued

| | | | | |
|---|---|---|---|---|
| Entire lens length | 669.52 | 669.52 | 669.52 | 669.52 |
| d10 | 2.77 | 157.24 | 184.04 | 197.68 |
| d17 | 280.86 | 104.37 | 62.65 | 2.00 |
| d24 | 19.22 | 5.43 | 2.03 | 38.20 |
| d28 | 3.50 | 39.30 | 57.63 | 68.47 |
| Entrance pupil position | 129.67 | 1149.02 | 3153.69 | 17257.92 |
| Exit pupil position | 133.28 | 133.28 | 133.28 | 133.28 |
| Front principal point position | 139.21 | 1323.64 | 4183.73 | 27578.10 |
| Rear principal point position | 1.10 | −87.50 | −290.00 | −1058.00 |

Imaging magnification of each lens unit

| | | | | |
|---|---|---|---|---|
| β1 | 0.00 | 0.00 | 0.00 | 0.00 |
| β2 | −0.12 | −0.50 | −1.13 | −3.10 |
| β3 | −0.40 | −1.47 | −2.56 | −3.95 |
| β4 | 0.67 | 0.47 | 0.37 | 0.32 |
| β5 | 1.08 | 1.08 | 1.08 | 1.08 |

Zoom lens unit data

| Unit | First surface | Focal length | Lens structure length | Front principal point position | Rear principal point position |
|---|---|---|---|---|---|
| 1 | 1 | 255.48 | 114.58 | 65.47 | −19.09 |
| 2 | 11 | −24.37 | 22.73 | 6.48 | −8.41 |
| 3 | 18 | 91.75 | 34.16 | 4.55 | −17.75 |
| 4 | 25 | 182.76 | 12.75 | 1.83 | −5.91 |
| 5 | 29 | 37.03 | 168.94 | 53.49 | 12.97 |

Single lens data

| Lens | Leading surface | Focal length |
|---|---|---|
| 1 | 1 | −427.33 |
| 2 | 3 | 483.37 |
| 3 | 5 | 739.36 |
| 4 | 7 | 681.55 |
| 5 | 9 | 793.42 |
| 6 | 11 | −52.95 |
| 7 | 13 | −36.20 |
| 8 | 14 | 35.99 |
| 9 | 16 | −53.58 |
| 10 | 18 | 170.01 |
| 11 | 20 | 164.01 |
| 12 | 22 | −133.67 |
| 13 | 23 | 154.08 |
| 14 | 25 | −325.20 |
| 15 | 27 | 116.19 |
| 16 | 30 | −25.13 |
| 17 | 31 | 36.02 |
| 18 | 33 | −22.70 |
| 19 | 34 | 35.88 |
| 20 | 36 | 89.12 |
| 21 | 38 | −36.98 |
| 22 | 39 | 53.12 |
| 23 | 41 | 60.17 |
| 24 | 42 | −58.21 |
| 25 | 44 | 72.48 |
| 26 | 46 | 0.00 |
| 27 | 47 | 0.00 |

Numerical Embodiment 4
Unit: mm
Surface data

| Surface No. | r | d | nd | vd | Effective diameter |
|---|---|---|---|---|---|
| 1 | 14862.426 | 6.00 | 1.83400 | 37.2 | 200.64 |
| 2 | 360.176 | 2.00 | | | 195.64 |
| 3 | 365.401 | 23.00 | 1.43387 | 95.1 | 196.29 |
| 4 | −728.207 | 23.80 | | | 196.79 |
| 5 | 375.424 | 24.00 | 1.43387 | 95.1 | 201.35 |
| 6 | −754.873 | 0.10 | | | 201.01 |
| 7 | 238.485 | 18.30 | 1.43387 | 95.1 | 194.39 |
| 8 | 970.213 | 1.52 | | | 193.41 |
| 9 | 181.117 | 15.40 | 1.49700 | 81.5 | 183.14 |
| 10 | 321.998 | (Variable) | | | 180.68 |
| 11* | −7391.657 | 2.20 | 2.00330 | 28.3 | 46.02 |
| 12 | 40.210 | 10.00 | | | 39.72 |
| 13 | −44.101 | 1.45 | 1.81600 | 46.6 | 39.70 |
| 14 | 94.677 | 7.70 | 1.95906 | 17.5 | 41.03 |
| 15 | −85.559 | 2.00 | | | 41.35 |
| 16 | −73.581 | 2.00 | 1.69680 | 55.5 | 40.90 |
| 17 | −167.025 | (Variable) | | | 41.20 |
| 18 | 64.413 | 13.50 | 1.43875 | 94.9 | 72.95 |
| 19* | −307.443 | 0.10 | | | 72.87 |
| 20 | 91.735 | 11.00 | 1.49700 | 81.5 | 70.98 |
| 21 | −1379.780 | 0.10 | | | 69.56 |
| 22 | 300.742 | 2.00 | 1.84666 | 23.8 | 67.90 |
| 23 | 96.025 | 10.95 | 1.43875 | 94.9 | 65.24 |
| 24 | −207.750 | 0.50 | | | 64.17 |
| 25 | 199.118 | 5.48 | 1.49700 | 81.5 | 60.24 |
| 26* | −2160.563 | (Variable) | | | 57.72 |
| 27 | 340.647 | 1.40 | 1.77250 | 49.6 | 41.24 |
| 28 | 75.066 | 4.00 | 1.80809 | 22.8 | 39.74 |
| 29 | 103.655 | (Variable) | | | 38.39 |
| 30 (Stop) | ∞ | 5.00 | | | 26.44 |
| 31 | −94.008 | 1.40 | 1.88300 | 40.8 | 24.41 |
| 32 | 61.994 | 4.67 | 1.80809 | 22.8 | 24.00 |
| 33 | −106.735 | 2.00 | | | 23.68 |
| 34 | −89.203 | 1.40 | 1.88300 | 40.8 | 22.93 |
| 35 | 489.134 | 8.95 | | | 22.74 |
| 36 | −253.259 | 1.50 | 1.72916 | 54.7 | 21.78 |
| 37 | 21.603 | 4.77 | 1.80518 | 25.4 | 21.65 |
| 38 | 68.704 | 4.21 | | | 21.44 |
| 39 | −32.718 | 1.80 | 1.72000 | 43.7 | 21.62 |
| 40 | 34.031 | 7.71 | 1.58267 | 46.4 | 23.68 |
| 41 | −50.695 | 7.00 | | | 25.52 |
| 42 | 64.533 | 6.33 | 1.51823 | 58.9 | 30.03 |
| 43 | −44.497 | 0.22 | | | 30.24 |
| 44 | 105.071 | 1.50 | 1.83400 | 37.2 | 29.86 |
| 45 | 28.056 | 7.23 | 1.51633 | 64.1 | 29.20 |
| 46 | −233.823 | 0.71 | | | 29.41 |
| 47 | 2330.568 | 7.29 | 1.48749 | 70.2 | 29.48 |
| 48 | −28.393 | 1.50 | 1.85026 | 32.3 | 29.57 |
| 49 | −65.537 | 0.20 | | | 30.57 |
| 50 | 76.994 | 6.04 | 1.48749 | 70.2 | 80.84 |
| 51 | −59.836 | 8.00 | | | 30.63 |
| 52 | ∞ | 33.00 | 1.60859 | 46.4 | 50.00 |
| 53 | ∞ | 13.20 | 1.51633 | 64.2 | 50.00 |
| 54 | ∞ | 10.00 | | 50.00 | |
| Image plane | ∞ | | | | |

Aspherical surface data

Eleventh surface

K = 7.23170e+004   A4 = 6.36458e−007   A6 = 2.27879e−010   A8 = −1.52413e−012
A10 = 2.97068e−015   A12 = −2.21757e−018

Nineteenth surface

K = 0.00000e+000   A4 = 4.65119e−007   A6 = −1.77056e−010   A8 = 1.06615e−013
A10 = −2.72972e−017   A12 = 2.29044e−021

-continued

Twenty-sixth surface

| K = 0.00000e+000 | A4 = 1.26646e−006 | A6 = 7.92006e−010 | A8 = −4.52799e−013 |
|---|---|---|---|
| A10 = 3.38746e−016 | A12 = 6.19534e−020 | | |

Various data
Zoom ratio 100.00

| | | | | |
|---|---|---|---|---|
| Focal length | 8.60 | 86.00 | 245.00 | 860.00 |
| F-number | 1.85 | 1.85 | 1.85 | 4.40 |
| Half angle of view | 32.60 | 3.66 | 1.29 | 0.37 |
| Image height | 5.50 | 5.50 | 5.50 | 5.50 |
| Entire lens length | 630.68 | 630.68 | 630.68 | 630.68 |
| d10 | 1.80 | 152.24 | 176.62 | 187.80 |
| d17 | 284.16 | 112.21 | 69.09 | 8.41 |
| d26 | 5.00 | 22.52 | 24.27 | 35.95 |
| d29 | 5.60 | 9.58 | 26.58 | 64.40 |
| Entrance pupil position | 125.65 | 1086.66 | 2689.37 | 13880.02 |
| Exit pupil position | 120.51 | 120.51 | 120.51 | 120.51 |
| Front principal point position | 134.92 | 1239.58 | 3477.52 | 21432.44 |
| Rear principal point position | 1.40 | −76.00 | −235.00 | −850.00 |

Imaging magnification of each lens unit

| | | | | |
|---|---|---|---|---|
| β1 | 0.00 | 0.00 | 0.00 | 0.00 |
| β2 | −0.13 | −0.55 | −1.12 | −2.12 |
| β3 | −0.23 | −0.54 | −0.72 | −1.17 |
| β4 | 1.30 | 1.32 | 1.41 | 1.60 |
| β5 | 0.87 | 0.87 | 0.87 | 0.87 |

Zoom lens unit data

| Unit | First surface | Focal length | Lens structure length | Front principal point position | Rear principal point position |
|---|---|---|---|---|---|
| 1 | 1 | 250.00 | 114.12 | 63.45 | −20.00 |
| 2 | 11 | −26.50 | 25.35 | 3.20 | −15.51 |
| 3 | 18 | 63.00 | 43.63 | 10.33 | −21.38 |
| 4 | 27 | −200.00 | 5.40 | 4.62 | 1.60 |
| 5 | 30 | 35.36 | 130.63 | 46.04 | 5.43 |

Single lens data

| Lens | Leading surface | Focal length |
|---|---|---|
| 1 | 1 | −439.87 |
| 2 | 3 | 562.98 |
| 3 | 5 | 580.17 |
| 4 | 7 | 721.52 |
| 5 | 9 | 801.35 |
| 6 | 11 | −39.52 |
| 7 | 13 | −36.51 |
| 8 | 14 | 47.24 |
| 9 | 16 | −189.61 |
| 10 | 18 | 122.43 |
| 11 | 20 | 173.00 |
| 12 | 22 | −165.73 |
| 13 | 23 | 150.96 |
| 14 | 25 | 366.05 |
| 15 | 27 | −124.33 |
| 16 | 28 | 313.63 |
| 17 | 31 | −41.89 |
| 18 | 32 | 48.64 |
| 19 | 34 | −84.85 |
| 20 | 36 | −27.12 |
| 21 | 37 | 37.09 |
| 22 | 39 | −22.78 |
| 23 | 40 | 35.98 |
| 24 | 42 | 51.64 |
| 25 | 44 | −46.01 |
| 26 | 45 | 48.80 |
| 27 | 47 | 57.40 |
| 28 | 48 | −59.60 |
| 29 | 50 | 69.85 |
| 30 | 52 | 0.00 |
| 31 | 53 | 0.00 |

Numerical Embodiment 5
Unit: mm
Surface data

| Surface No. | r | d | nd | vd | Effective diameter |
|---|---|---|---|---|---|
| 1 | 471.855 | 5.35 | 1.77250 | 49.6 | 173.24 |
| 2 | 99.620 | 47.64 | | | 144.21 |
| 3 | −183.975 | 4.40 | 1.69680 | 55.5 | 143.38 |
| 4 | 730.786 | 0.11 | | | 146.46 |
| 5 | 245.637 | 11.66 | 1.80518 | 25.4 | 149.55 |
| 6 | 1289.588 | 6.40 | | | 149.36 |
| 7 | 36367.010 | 20.44 | 1.43387 | 95.1 | 149.10 |
| 8 | −168.462 | 0.10 | | | 148.97 |
| 9 | −1829.623 | 4.20 | 1.72047 | 34.7 | 140.19 |
| 10 | 250.407 | 16.27 | 1.49700 | 81.5 | 136.09 |
| 11 | −535.747 | 28.96 | | | 135.50 |
| 12 | 631.782 | 20.62 | 1.43387 | 95.1 | 140.94 |
| 13 | −200.586 | 1.60 | | | 141.76 |
| 14 | 170.462 | 4.30 | 1.75520 | 27.5 | 141.53 |
| 15 | 114.039 | 0.92 | | | 136.95 |
| 16 | 117.705 | 28.28 | 1.49700 | 81.5 | 136.98 |
| 17 | −1555.593 | 0.33 | | | 136.08 |
| 18 | 163.101 | 13.67 | 1.62041 | 60.3 | 130.97 |
| 19 | 748.250 | (Variable) | | | 129.51 |
| 20* | 285.940 | 2.50 | 1.77250 | 49.6 | 56.88 |
| 21 | 53.705 | 2.79 | | | 50.12 |
| 22 | 52.131 | 10.85 | 1.80809 | 22.8 | 48.03 |
| 23 | −99.672 | 1.50 | 1.75500 | 52.3 | 45.87 |
| 24 | 38.854 | 8.99 | | | 37.00 |
| 25 | −47.801 | 1.50 | 1.88300 | 40.8 | 36.33 |
| 26 | −501.946 | (Variable) | | | 38.23 |
| 27 | 87.595 | 7.24 | 1.59282 | 68.6 | 45.05 |
| 28* | −137.922 | 0.10 | | | 45.20 |
| 29 | 90.273 | 7.81 | 1.43875 | 94.9 | 44.88 |
| 30 | −97.250 | 0.50 | | | 44.39 |
| 31 | −86.513 | 1.90 | 1.84666 | 23.8 | 44.29 |
| 32 | −2465.404 | 4.84 | 1.43875 | 94.9 | 44.19 |
| 33 | −90.032 | (Variable) | | | 44.12 |
| 34* | 285.457 | 5.35 | 1.59282 | 68.6 | 39.33 |
| 35 | −101.752 | (Variable) | | | 38.74 |
| 36 (Stop) | ∞ | 2.67 | | | 26.48 |
| 37 | −64.259 | 1.50 | 1.69680 | 55.5 | 25.68 |
| 38 | 21.051 | 5.23 | 1.80809 | 22.8 | 24.63 |
| 39 | 44.899 | 5.79 | | | 23.96 |
| 40 | −64.846 | 1.50 | 1.77250 | 49.6 | 24.04 |
| 41 | 31.286 | 11.44 | 1.60342 | 38.0 | 24.97 |
| 42 | −28.116 | 0.20 | | | 26.61 |
| 43 | −30.113 | 1.60 | 1.81600 | 46.6 | 26.53 |
| 44 | 72.890 | 14.06 | 1.59551 | 39.2 | 28.63 |
| 45 | −46.529 | 5.45 | | | 33.02 |
| 46 | 7364.164 | 5.74 | 1.53172 | 48.8 | 35.43 |
| 47 | −69.758 | 0.20 | | | 36.04 |
| 48 | 252.725 | 2.00 | 1.88300 | 40.8 | 36.03 |
| 49 | 39.210 | 9.70 | 1.49700 | 81.5 | 35.64 |
| 50 | −86.937 | 0.81 | | | 36.27 |
| 51 | 89.526 | 7.70 | 1.49700 | 81.5 | 36.55 |
| 52 | −55.768 | 2.00 | 1.76182 | 26.5 | 38.28 |
| 53 | −451.745 | 0.20 | | | 36.39 |
| 54 | 103.791 | 7.86 | 1.48749 | 70.2 | 36.34 |
| 55 | −49.821 | 13.04 | | | 35.97 |
| 56 | ∞ | 33.00 | 1.60859 | 46.4 | 60.00 |
| 57 | ∞ | 13.20 | 1.51633 | 64.2 | 60.00 |
| 58 | ∞ | 11.76 | | | 60.00 |
| Image plane | ∞ | | | | |

-continued

Aspherical surface data

Twentieth surface

K = −1.14700e+002  A4 = 7.66246e−007  A6 = −2.51953e−010  A8 = −4.59574e−015

Twenty-eighth surface

K = −2.23854e+000  A4 = 6.41527e−007  A6 = −7.95589e−011  A8 = 1.18571e−014

Thirty-fourth surface

K = −2.52612e+001  A4 = −6.58605e−007  A6 = −4.00191e−010  A8 = 2.40984e−013

Various data
Zoom ratio 26.00

| | | | | |
|---|---|---|---|---|
| Focal length | 6.75 | 34.40 | 124.00 | 175.50 |
| F-number | 1.65 | 1.65 | 1.65 | 2.30 |
| Half angle of view | 39.17 | 9.08 | 2.54 | 1.79 |
| Image height | 5.50 | 5.50 | 5.50 | 5.50 |
| Entire lens length | 589.68 | 589.68 | 589.68 | 589.68 |
| d19 | 2.03 | 79.49 | 109.66 | 114.14 |
| d26 | 156.65 | 66.80 | 17.86 | 1.25 |
| d33 | 1.23 | 0.50 | 16.34 | 33.63 |
| d35 | 2.00 | 15.12 | 18.06 | 12.88 |
| Entrance pupil position | 105.97 | 226.21 | 555.78 | 823.73 |
| Exit pupil position | 147.91 | 147.91 | 147.91 | 147.91 |
| Front principal point position | 113.05 | 269.30 | 792.71 | 1225.45 |
| Rear principal point position | 5.01 | −22.64 | −112.24 | −163.74 |

Imaging magnification of each lens unit

| | | | | |
|---|---|---|---|---|
| β1 | 0.00 | 0.00 | 0.00 | 0.00 |
| β2 | −0.24 | −0.63 | −1.73 | −2.33 |
| β3 | −0.48 | −1.12 | −1.55 | −1.50 |
| β4 | 0.61 | 0.50 | 0.48 | 0.52 |
| β5 | 0.93 | 0.93 | 0.93 | 0.93 |

Zoom lens unit data

| Unit | First surface | Focal length | Lens structure length | Front principal point position | Rear principal point position |
|---|---|---|---|---|---|
| 1 | 1 | 103.59 | 215.24 | 126.40 | 68.69 |
| 2 | 20 | −29.96 | 28.13 | 15.33 | −4.68 |
| 3 | 27 | 65.68 | 22.39 | 3.86 | −11.55 |
| 4 | 34 | 126.75 | 5.35 | 2.49 | −0.89 |
| 5 | 36 | 33.63 | 144.90 | 44.42 | 9.45 |

Single lens data

| Lens | Leading surface | Focal length |
|---|---|---|
| 1 | 1 | −163.72 |
| 2 | 3 | −209.61 |
| 3 | 5 | 371.53 |
| 4 | 7 | 385.59 |
| 5 | 9 | −303.39 |
| 6 | 10 | 344.73 |
| 7 | 12 | 352.68 |
| 8 | 14 | −467.75 |
| 9 | 16 | 220.77 |
| 10 | 18 | 331.87 |
| 11 | 20 | −85.59 |
| 12 | 22 | 43.32 |
| 13 | 23 | −36.69 |
| 14 | 25 | −59.58 |
| 15 | 27 | 91.14 |
| 16 | 29 | 107.81 |
| 17 | 31 | −104.90 |
| 18 | 32 | 212.31 |
| 19 | 34 | 126.75 |
| 20 | 37 | −22.50 |
| 21 | 38 | 44.19 |
| 22 | 40 | −27.00 |
| 23 | 41 | 26.30 |
| 24 | 43 | −25.80 |
| 25 | 44 | 49.59 |
| 26 | 46 | 129.37 |
| 27 | 48 | −52.49 |
| 28 | 49 | 55.64 |
| 29 | 51 | 70.18 |
| 30 | 52 | −82.96 |
| 31 | 54 | 69.99 |
| 32 | 56 | 0.00 |
| 33 | 57 | 0.00 |

Numerical Embodiment 6
Unit: mm
Surface data

| Surface No. | r | d | nd | vd | Effective diameter |
|---|---|---|---|---|---|
| 1 | −3840.481 | 6.00 | 1.83400 | 37.2 | 214.23 |
| 2 | 403.672 | 9.90 | | | 207.67 |
| 3 | 415.242 | 19.09 | 1.43387 | 95.1 | 206.46 |
| 4 | −1953.416 | 0.25 | | | 205.64 |
| 5 | 1333.417 | 17.20 | 1.43387 | 95.1 | 203.10 |
| 6 | −532.556 | 23.59 | | | 202.31 |
| 7 | 336.794 | 17.32 | 1.43387 | 95.1 | 189.76 |
| 8 | −7293.946 | 0.25 | | | 188.14 |
| 9 | 321.377 | 13.62 | 1.43387 | 95.1 | 179.39 |
| 10 | 1876.335 | 1.20 | | | 178.28 |
| 11 | 168.023 | 13.66 | 1.43875 | 94.9 | 167.50 |
| 12 | 308.623 | (Variable) | | | 165.69 |
| 13 | 352.111 | 2.00 | 1.88300 | 40.8 | 44.88 |
| 14 | 39.732 | 8.41 | | | 39.03 |
| 15 | −83.784 | 1.90 | 1.81600 | 46.6 | 38.23 |
| 16 | 470.490 | 4.68 | | | 37.54 |
| 17 | −87.160 | 1.90 | 1.88300 | 40.8 | 37.04 |
| 18 | 61.850 | 6.12 | 1.95906 | 17.5 | 37.67 |
| 19 | −273.326 | (Variable) | | | 37.82 |
| 20 | −537.165 | 11.28 | 1.49700 | 81.5 | 68.71 |
| 21 | −74.300 | 2.08 | | | 70.21 |
| 22 | −64.637 | 4.00 | 1.77250 | 49.6 | 70.27 |
| 23 | −79.529 | (Variable) | | | 73.51 |
| 24 | 118.208 | 12.96 | 1.59522 | 67.7 | 78.60 |
| 25 | −300.411 | 0.30 | | | 78.27 |
| 26 | 97.316 | 2.50 | 1.80518 | 25.4 | 75.09 |
| 27 | 54.065 | 14.26 | 1.43875 | 94.9 | 70.72 |
| 28 | 250.000 | 1.38 | | | 69.77 |
| 29 | 140.179 | 6.88 | 1.59522 | 67.7 | 68.93 |
| 30 | ∞ | (Variable) | | | 68.02 |
| 31 (Stop) | ∞ | 3.97 | | | 36.56 |
| 32 | −173.665 | 1.80 | 1.81600 | 46.6 | 34.78 |
| 33 | 48.520 | 6.63 | 1.80809 | 22.8 | 33.58 |
| 34 | 422.190 | 15.13 | | | 32.75 |
| 35 | −30.242 | 4.00 | 1.81600 | 46.6 | 29.21 |
| 36 | 79.081 | 15.65 | 1.54814 | 45.8 | 32.23 |
| 37 | −29.911 | 27.65 | | | 35.91 |
| 38 | −90.581 | 7.39 | 1.48749 | 70.2 | 33.56 |
| 39 | −50.701 | 6.07 | | | 34.01 |
| 40 | 208.408 | 4.00 | | 37.2 | 31.67 |
| 41 | 30.986 | 6.02 | 1.48749 | 70.2 | 30.19 |
| 42 | −192.836 | 0.67 | | | 30.20 |
| 43 | 462.304 | 6.74 | 1.51742 | 52.4 | 30.10 |
| 44 | −25.186 | 4.00 | 1.88300 | 40.8 | 30.00 |
| 45 | −79.447 | 0.40 | | | 31.69 |
| 46 | 123.454 | 5.91 | 1.51742 | 52.4 | 31.91 |

-continued

| 47 | −40.390 | 15.00 | | | 31.84 |
| 48 | ∞ | 33.00 | 1.60659 | 46.4 | 60.00 |
| 49 | ∞ | 13.20 | 1.51633 | 64.2 | 60.00 |
| 50 | ∞ | 9.98 | | | 60.00 |
| Image plane | ∞ | | | | |

Various data
Zoom ratio 100.00

| | | | | |
|---|---|---|---|---|
| Focal length | 8.90 | 84.40 | 280.00 | 801.00 |
| F-number | 1.85 | 1.85 | 1.85 | 4.50 |
| Half angle of view | 31.72 | 3.73 | 1.13 | 0.39 |
| Image height | 5.50 | 5.50 | 5.50 | 5.50 |
| Entire lens length | 684.45 | 684.45 | 684.45 | 684.45 |
| d12 | 2.63 | 153.54 | 180.90 | 192.28 |
| d19 | 269.77 | 108.90 | 56.95 | 4.80 |
| d23 | 19.12 | 1.72 | 2.06 | 9.31 |
| d30 | 3.00 | 30.37 | 54.62 | 88.14 |
| Entrance pupil position | 131.20 | 1011.46 | 2579.58 | 8438.66 |
| Exit pupil position | 129.62 | 129.62 | 129.62 | 129.62 |
| Front principal point position | 140.76 | 1155.40 | 3514.87 | 14602.36 |
| Rear principal point position | 1.08 | −74.42 | −270.02 | −791.02 |

Imaging magnification of each lens unit

| | | | | |
|---|---|---|---|---|
| β1 | 0.00 | 0.00 | 0.00 | 0.00 |
| β2 | −0.13 | −0.50 | −1.09 | −2.16 |
| β3 | −4.68 | 2.86 | 2.05 | 1.72 |
| β4 | 0.06 | −0.23 | −0.49 | −0.84 |
| β5 | 1.03 | 1.03 | 1.03 | 1.03 |

-continued

Zoom lens unit data

| Unit | First surface | Focal length | Lens structure length | Front principal point position | Rear principal point position |
|---|---|---|---|---|---|
| 1 | 1 | 248.81 | 122.07 | 74.99 | −14.54 |
| 2 | 13 | −25.22 | 25.02 | 5.10 | −13.60 |
| 3 | 20 | 268.45 | 17.36 | 14.10 | 2.32 |
| 4 | 24 | 94.47 | 38.28 | 7.00 | −19.18 |
| 5 | 31 | 43.17 | 177.21 | 67.98 | 11.30 |

Single lens data

| Lens | Leading surface | Focal length |
|---|---|---|
| 1 | 1 | −434.92 |
| 2 | 3 | 789.24 |
| 3 | 5 | 877.39 |
| 4 | 7 | 740.64 |
| 5 | 9 | 889.21 |
| 6 | 11 | 814.33 |
| 7 | 13 | −50.58 |
| 8 | 15 | −86.58 |
| 9 | 17 | −40.49 |
| 10 | 18 | 52.37 |
| 11 | 20 | 171.60 |
| 12 | 22 | −503.87 |
| 13 | 24 | 143.68 |
| 14 | 26 | −153.67 |
| 15 | 27 | 153.42 |
| 16 | 29 | 234.68 |
| 17 | 32 | −46.07 |
| 18 | 33 | 66.61 |
| 19 | 35 | −26.24 |
| 20 | 36 | 41.51 |
| 21 | 38 | 221.93 |
| 22 | 40 | −43.82 |
| 23 | 41 | 55.07 |
| 24 | 43 | 46.18 |
| 25 | 44 | −43.02 |
| 26 | 46 | 59.28 |
| 27 | 48 | 0.00 |
| 28 | 49 | 0.00 |

TABLE 1

Conditional expression corresponding values in Numerical Embodiments 1 to 6

| | Embodiment | | | | | |
|---|---|---|---|---|---|---|
| | 1 | 2 | 3 | 4 | 5 | 6 |
| fw | 9.00 | 9.20 | 8.90 | 8.60 | 6.75 | 8.90 |
| ft | 900.00 | 920.00 | 1,068.00 | 860.00 | 175.50 | 801.00 |
| Zoom magnification | 100.00 | 100.00 | 120.00 | 100.00 | 26.00 | 90.00 |
| m2 | 167.25 | 182.05 | 178.44 | 171.96 | 95.02 | 176.10 |
| m3 | −14.59 | −39.12 | −33.24 | −33.70 | −17.17 | −30.48 |
| f34w | 76.52 | 68.72 | 71.14 | 75.00 | 46.99 | 74.78 |
| f34z | 66.13 | 64.37 | 66.06 | 66.96 | 47.01 | 71.10 |
| β2wt | 19.86 | 18.14 | 25.83 | 15.88 | 9.72 | 17.24 |
| β34wt | 5.04 | 5.51 | 4.65 | 6.30 | 2.67 | 5.22 |
| f1 | 268.44 | 264.54 | 255.48 | 250.00 | 103.59 | 248.81 |
| f2 | −24.98 | −27.26 | −24.37 | −26.50 | −29.96 | −25.22 |
| f3 | 115.10 | 74.67 | 91.75 | 63.00 | 65.68 | 268.45 |
| f4 | 121.89 | 349.98 | 182.76 | −200.00 | 126.75 | 94.47 |
| Conditional expression | | | | | | |
| (1) β34 | −0.83 | −0.92 | −0.91 | −0.91 | −0.66 | −0.95 |
| (2) |m2/m3| | 11.47 | 4.65 | 5.37 | 5.10 | 5.53 | 5.78 |
| (3) f34w/f34z | 1.16 | 1.04 | 1.08 | 1.12 | 1.00 | 1.05 |
| (4) |ft/f1| | 3.35 | 3.48 | 4.18 | 3.44 | 1.69 | 3.22 |
| (5) |f1/f2| | 10.75 | 9.70 | 10.48 | 9.43 | 3.46 | 9.87 |
| (6) |β2wt/β34wt| | 3.94 | 3.29 | 5.56 | 2.52 | 3.63 | 3.30 |

TABLE 1-continued

Conditional expression corresponding values in Numerical Embodiments 1 to 6

| | | Embodiment | | | | | |
|---|---|---|---|---|---|---|---|
| | | 1 | 2 | 3 | 4 | 5 | 6 |
| (7) | $|f3/f4|$ | 0.94 | 0.21 | 0.50 | 0.32 | 0.52 | 2.84 |
| (8) | $|\Delta 10/fw|$ | 2.28E−02 | 3.44E−03 | 2.70E−03 | 1.48E−01 | 2.01E−02 | — |
| (9) | $|\Delta 9/fw|$ | 1.43E−02 | 1.86E−03 | 1.88E−03 | 8.56E−02 | 1.23E−02 | — |
| (10) | $|\Delta 7/fw|$ | 4.56E−03 | 3.37E−04 | 7.75E−04 | 2.42E−02 | 3.73E−02 | — |

"E-Z" means "$\times 10^{-Z}$".

What is claimed is:

1. A zoom lens, comprising, in order from an object side to an image side:
    a first lens unit having a positive refractive power which does not move for zooming;
    a second lens unit having a negative refractive power which moves during zooming;
    a third lens unit having a positive refractive power which moves during zooming;
    a fourth lens unit which moves during zooming; and
    a fifth lens unit having a positive refractive power which does not move for zooming,
    wherein the second lens unit passes through a point at which, an imaging magnification of the second lens unit becomes −1 during zooming from a wide-angle end to a telephoto end, and the following expressions are satisfied:

$-1 < \beta 34 < -0.3$, and $4.0 < |m2/m3| < 15$, where β34 represents an imaging magnification of a combined lens unit including the third lens unit and the fourth lens unit at a zoom position fz at which the imaging magnification of the second lens unit becomes −1, and m2 and m3 respectively represent displacements of the second lens unit and the third lens unit on an optical axis at the room position fz with reference to the wide-angle end.

2. A zoom lens according to claim 1, wherein the third lens unit passes through a point at which an imaging magnification of the third lens unit becomes −1 during the zooming from the wide-angle end to the telephoto end.

3. A zoom lens according to claim 1, wherein the fourth lens unit passes through a point at which an imaging magnification of the fourth lens unit becomes −1 during the zooming from the wide-angle end to the telephoto end.

4. A zoom lens according to claim 1, wherein the following expression is satisfied:

$0.95 < f34w/f34z < 1.50$, where f34w represents a combined focal length of the third lens unit and the fourth lens unit at the wide-angle end, and f34z represents a focal length of the combined lens unit including the third lens unit and the fourth lens unit at the zoom position fz.

5. A zoom lens according to claim 1, wherein the following expressions are satisfied:

$1.5 < |ft/f1| < 5.0$, and $3.0 < |f1/f2| < 15.0$, where f1 represents a focal length of the first lens unit, f2 represents a focal length of the second lens unit, and ft represents a focal length at the telephoto end.

6. A zoom lens according to claim 1, wherein the following expression is satisfied:

$20.0 < \beta 2wt/\beta 34wt < 7.0$, where β2 wt represents a ratio of lateral magnification of the second lens unit between the wide-angle end and the telephoto end, and β34 wt represents a ratio of lateral magnification of the combined lens unit including the third lens unit and the fourth lens unit between the wide-angle end and the telephoto end.

7. A zoom lens according to claim 1, wherein:
    the fourth lens unit has at least one surface formed an aspherical surface;
    when the aspherical surface of the fourth lens unit is applied to a surface having a positive refractive power, the surface has such a shape that the positive refractive power is smaller toward a periphery from an intersection of the optical axis and the aspherical surface;
    when the aspherical surface of the fourth lens unit is applied to a surface having a negative refractive power, the surface has such a shape that the negative refractive power is larger toward the periphery from the intersection of the optical axis and the aspherical surface; and
    the following expression is satisfied:

$0.1 < |f3/f4| < 1.0$, where f3 represents a focal length of the third lens unit, and f4 represents a focal length of the fourth lens unit.

8. A 20 cm lens according to claim 1, wherein the following expressions are satisfied:

$1.5 \times 10^{-3} < |\Delta 10/fw| < 2.0 \times 10^{-1}$, $5.0 \times 10^{-4} < |\Delta 9/fw| < 1.0 \times 10^{-1}$, and $5.0 \times 10^{-5} < |\Delta 7/fw| < 3.0 \times 10^{-2}$, where Δ10, Δ9, and Δ7 respectively represent aspheric amounts at 100%, 90%, and 70% of an effective diameter of an aspherical surface of the fourth lens unit, and fw represents a focal length at the wide-angle end.

9. A zoom lens according to claim 1, wherein the fourth lens unit has a positive refractive power and includes at least one positive lens and at least one negative lens.

10. An image pickup apparatus, comprising:
    the zoom lens according to claim 1; and
    a solid-state image pickup element for receiving light of an image formed by the zoom lens.

* * * * *